(12) United States Patent
Davis et al.

(10) Patent No.: US 12,203,578 B2
(45) Date of Patent: Jan. 21, 2025

(54) SUSPENSION ASSEMBLY

(71) Applicant: GRIPPLE LIMITED, Sheffield (GB)

(72) Inventors: Simon Davis, Sheffield (GB); Oliver Sunderland, Sheffield (GB)

(73) Assignee: GRIPPLE LIMITED (GB)

(*) Notice: Subject to any disclaimer, the term of this patent is extended or adjusted under 35 U.S.C. 154(b) by 182 days.

(21) Appl. No.: 17/633,494

(22) PCT Filed: Aug. 24, 2020

(86) PCT No.: PCT/IB2020/057893
§ 371 (c)(1),
(2) Date: Feb. 7, 2022

(87) PCT Pub. No.: WO2021/048666
PCT Pub. Date: Mar. 18, 2021

(65) Prior Publication Data
US 2022/0282804 A1 Sep. 8, 2022

(30) Foreign Application Priority Data

Sep. 9, 2019 (GB) .................................... 1912932
Jul. 20, 2020 (GB) .................................... 2011165
Aug. 21, 2020 (GB) .................................... 2013103

(51) Int. Cl.
*F16L 3/12* (2006.01)
*F16L 3/11* (2006.01)
(52) U.S. Cl.
CPC ............... *F16L 3/1207* (2013.01); *F16L 3/11* (2013.01)

(58) Field of Classification Search
CPC . F16L 3/1207; F16L 3/11; F16L 3/133; F16L 3/22; F16L 3/23; F16L 3/24;
(Continued)

(56) References Cited

U.S. PATENT DOCUMENTS 3,495,796 A * 2/1970 Friedrich .................. E04B 9/20
248/327
4,957,251 A * 9/1990 Hubbard .................... F16L 3/22
248/300
(Continued)

FOREIGN PATENT DOCUMENTS

CN 205986006 U 2/2017
EP 2838170 B1 3/2016
(Continued)

*Primary Examiner* — Patrick J Maestri
(74) *Attorney, Agent, or Firm* — Clark Hill PLC; James R. Foley

(57) ABSTRACT

A suspension assembly (10) comprising: a support member (12) for supporting an item; an elongate suspension article (14) defining a securing opening (30); and a securing device (16) on the support member (12). The support member (12) defines an aperture (38) through which the suspension article (14) can be inserted. The securing device (16) has a securing member (68) movable across the aperture (38) between a securing position and a non-securing position. The securing member (68) is receivable through the securing opening (30) in the suspension article (14) to secure the support member (12) to the suspension article (14) when the suspension article (14) is received through the aperture (38) and the securing member (68) is in the securing position.

19 Claims, 31 Drawing Sheets

(58) Field of Classification Search
CPC ....... F16L 3/20; F16L 3/08; F16L 3/00; E04B 9/20; E04B 9/205; E04B 9/18; F16B 5/0628; H02G 3/263; H02G 3/30; F16M 13/02; F16M 13/027
See application file for complete search history.

(56) References Cited

U.S. PATENT DOCUMENTS

| | | | | |
|---|---|---|---|---|
| 5,927,041 | A | * | 7/1999 | Sedlmeier ................ E04C 3/07 52/39 |
| 2013/0248660 | A1 | * | 9/2013 | Magno, Jr. .............. F16L 3/133 248/59 |
| 2015/0316177 | A1 | * | 11/2015 | Knutson ................... F16B 7/04 248/59 |
| 2015/0316203 | A1 | | 11/2015 | Zhang et al. |

FOREIGN PATENT DOCUMENTS

| | | |
|---|---|---|
| FR | 2540946 A3 | 8/1984 |
| GB | 2558759 A | 7/2018 |
| GB | 2575922 A | 1/2020 |
| JP | S47-38365 U | 12/1972 |
| JP | 2011-244579 A | 12/2011 |
| KR | 980 009 690 A | 4/1998 |
| WO | 2018/100329 A1 | 6/2018 |

\* cited by examiner

SUSPENSION ASSEMBLY

This invention relates to suspension assemblies. This invention also relates to suspension articles for use with suspension assemblies.

It is known to suspend pipes and cable trays from roofs or ceilings by means of brackets attached to threaded rods. The rods have to be cut to length and screwed into attachments in the roof or ceiling. The threaded rods are inserted through apertures in the brackets and attached to the brackets using nuts screwed onto the rods. All of these steps, particularly the cutting of the rods, can be very time consuming. In addition, some systems use suspending straps attached to struts, but these systems have a tendency to lack the desired stability.

According to one aspect of this invention, there is provided a suspension assembly comprising:
- a support member for supporting an item;
- an elongate suspension article defining a securing opening;
- a securing device on the support member;
- the support member defining an aperture through which the suspension article can be inserted;
- wherein the securing device has a securing member;
- the securing member being movable across the aperture between a securing position and a non-securing position, the securing member being receivable through the securing opening in the suspension article to secure the support member to the suspension article when the suspension article is received through the aperture and the first securing member is in the securing position.

The securing device may comprise an attaching arrangement for attaching the securing device to the support member. The securing device may be received in an end region of the support member. A respective one of the securing devices may be received in each end region of the support member.

The suspension article may comprise an elongate main element. The suspension article may have a mounting element for mounting the suspension article on a raised structure, such as a roof beam or ceiling.

The main element may have a longitudinally extending main axis. The main element may have an elongate inner region extending along the main axis. The inner region may cooperate with the securing member to secure the support member to the suspension article.

The main element may be curved. The inner region may be curved about said main axis.

According to another aspect of this invention, there is provided a support member comprising:
- a central member and a side member arranged transverse to each other;
- the central member defining a first aperture through which an elongate suspension article can be inserted when the support member is in the first orientation; and
- the side member defining a second aperture through which the suspension article can be inserted when the support member is in the second orientation.

According to another aspect of this invention, there is provided a securing device for use in a suspension assembly, the securing device comprising:
- a securing member; and
- an attaching arrangement for attaching the securing device to a support member, the securing member being held by the attaching arrangement;
- wherein the securing member is movable between securing and non-securing positions.

According to another aspect of this invention, there is provided a suspension article for use in a suspension assembly, the suspension article comprising:
- an elongate main element defining a securing opening, the main element having a longitudinally extending main axis; and
- a mounting element for mounting the suspension article on a raised structure;
- wherein the main element has an elongate inner region extending along the main axis, the inner region being curved about said main axis.

The attaching arrangement may define a hole across which the securing member extends when the securing member is in the securing position.

The suspension article may define a plurality of the securing openings, wherein the securing member can be received in a selected one of the securing openings. The securing openings may be arranged one after another along the main element.

In a first version of the suspension article, the inner region may define the securing opening.

The support member may have a central member and a side member arranged transverse to each other. The central member may define the aperture through which the suspension article can be inserted.

The aperture may be a first aperture defined by the central member. The suspension article may be insertable through the first aperture when the support member is in a first orientation.

The side member may define a second aperture through which the suspension article can be inserted when the support member is in a second orientation.

The securing device may comprise a release means for moving the securing member to the non-securing position. The securing device may comprise an urging member for urging the securing member to the securing position.

The urging member may extend between a reaction portion and the securing member. The reaction portion may apply a reaction force to the urging member to enable the urging member to urge the securing member to the securing position.

The securing device may have first and second securing members arranged transverse to each other. The first and second securing members may be held by the attaching arrangement.

The first securing member may be movable across the first aperture between a securing position and a non-securing position of the first securing member. The first securing member may be receivable through the securing opening in the suspension article to secure the support member to the suspension article when the suspension article is received through the first aperture and the first securing member is in its securing position.

The second securing member may be movable across the second aperture between a securing position and a non-securing position of the second securing member. The second securing member may be receivable through the securing opening in the suspension article to secure the support member to the suspension article when the suspension article is received through the second aperture and the second securing member is in its securing position.

When the suspension article is secured to the securing device, the main element may be deformed to a stowed condition at a desired location on the main element. The main element may be so deformed by bending the main element to provide a bent region, wherein the bent region extends along the support member.

The support member may be elongate. The aperture defined by the support member may be a slot. The aperture may extend across the support member. Alternatively, the aperture may extend along the support member. The central member may be elongate. The aperture may extend across the central member. Alternatively, the aperture may extend along the central member.

The support member may define two of the apertures. The support member may comprise a spacer portion arranged between the two apertures. The two apertures may be defined by the central member.

In one embodiment, opposite end regions of the support member may extend from the apertures. The end regions may support articles. The articles may be electric cables or trays containing electric cables. The spacer portion may space the apertures from each other. The spacer portion may space the apertures from each other by a distance to prevent interference between the electric cables on each end region.

Each aperture may extend transverse to the longitudinal axis of the central member. Alternatively, each aperture may extend along the longitudinal axis of the central member.

The first and second apertures defined by the central and side members may be slots. The central member may be elongate. The central member may have a longitudinally extending axis. The side member may be elongate. The side member may have a longitudinally extending axis.

The first and second apertures may extend across the respective central and side members. The first and second apertures may extend transverse to the longitudinal axes of the respective central and side members.

The central member may define two of the first apertures. The central member may have opposite ends.

The two first apertures may be defined at respective opposite ends of the central member. Each first aperture may extend transverse to the longitudinal axis of the central member.

The side member may define two of the second apertures. The side member may have opposite ends.

The two second apertures may be defined at respective opposite ends of the side member. Each second aperture may extend transverse to the longitudinal axis of the side member.

The support member may have two of the side members, each side member extending from a respective opposite edge of the central member. Each side member may define a respective second aperture.

Each of the central and side members may be substantially planar.

Each side member may define two of the second apertures. The second apertures may be defined at opposite ends of the respective side member. Each second aperture may extend transverse to the longitudinal axis of the respective side member.

Both of the side members may extend in the same direction from the central member. The support member may have a substantially U shaped configuration.

Each side member may have an elongate free edge spaced from the central member. The free edge of each side member may comprise a respective inwardly extending return portion. Each of the return portions may extend along the respective free edge.

The securing device may comprise first and second of the securing members. The first and second securing members may be arranged transverse to each other.

The first and second securing members may be held by the attaching arrangement. Each of the first and second securing members may be movable between respective securing and non-securing positions. The second securing member may be arranged transverse to the first securing member.

Each of the first and second securing members may be substantially planar. The first and second securing members may be arranged substantially at right angles to each other. The second securing member may be arranged substantially at right angles to the first securing member.

The securing device may comprise two of the second securing members. The second securing members may extend parallel to each other. Each second securing member may be movable across the respective second aperture between respective second securing and non-securing positions of the second securing members.

The second securing members may be receivable through securing openings in the respective suspension articles to secure the support member to the suspension articles when the suspension articles is received through the second apertures and the second securing members are in their securing positions.

The first securing member may be movable across a first aperture in the support member. The second securing member may be movable across a second aperture in the support member.

The release means may be for moving the first and second securing members to their respective non-securing positions. The urging member may be for urging the first and second securing members to their respective securing positions.

The urging member may extend between a reaction portion and the first and second securing members, wherein the reaction portion applies a reaction force to the urging member to enable the urging member to urge the first and second securing members to their respective securing positions.

The securing device may comprise a unitary latching element comprising the first securing member and the second securing member. The latching element may comprise the release means. The securing device may comprise a latching element comprising the first securing member, both second securing members and the release means.

The latching element may define a hole into which the first securing member may extend. The first securing member may extend centrally into the hole.

The release means may comprise a release tab. The release tab may extend transverse to the securing member.

The release tab may be on the latching element. The release tab may be substantially planar. The release tab may extend transverse to the first and second securing members.

The attaching arrangement may comprise a housing in which the securing member is housed.

The first and second securing members may be housed by the housing. The latching element may be housed by the housing.

The latching element may be movable between a locking condition, in which the first and second securing members are in their respective securing positions, and a non-locking condition, in which the first and second securing members are in the non-securing positions. The release means may be pressable to move the latching element to the non-locking condition.

The housing may have an external wall arrangement. The external wall arrangement may comprise a central wall portion. The external wall arrangement may have a further wall member opposite the central wall portion.

The external wall arrangement may have two opposed side wall portions. The central wall portion may extend between the side wall portions.

The attaching arrangement may define a central hole. The attaching arrangement may define a side aperture.

The first and second securing members may extend across the respective central and side apertures when the securing member is in the securing position.

The central wall portion may define the central hole. When the housing is inserted in the support member, the central hole defined by the central wall portion may be aligned with the first aperture defined by the central member.

The housing may further include an internal arrangement within the external wall arrangement. The internal arrangement may comprise a first internal portion and a second internal portion. The first and second internal portions may define a gap therebetween.

The central hole and the gap may be aligned with each other. When the securing member is in the securing position, the securing member may extend across the central hole. When the securing member is in the non-securing position, the securing member may not extend across the central hole.

The first internal portion may comprise a guide portion for guiding the securing member. The guide portion may guide the securing member between the securing and non-securing positions.

The guide portion may be for guiding the first and second securing members to their respective securing positions. The guide portion may be for guiding the first and second securing members between their respective securing and non-securing positions.

The second internal portion may comprise the reaction portion for engaging the urging member and providing a reaction force thereto.

The main element of the suspension article may be received through the central hole in the central wall portion when said main element is received in the first aperture defined by the central member.

The main element of the suspension article may extend through the gap between the first internal portion and the second internal portion when said main element of the suspension article is received in the first aperture defined by the central member.

The first internal portion may have a central surface. The central surface may be adjacent the central wall portion of the external wall arrangement. The central surface may be spaced from the central wall portion of the external wall arrangement.

The first internal portion may have two opposite side surfaces. Each side surface may be adjacent a respective one of the side wall portions of the external wall arrangement. Each side surface may be spaced from said respective one of the side wall portions of the external wall arrangement.

The space between the central wall portion and the central surface may receive the first securing member. The central hole defined by the central wall portion may extend across the central surface.

The first securing member may be movable between the first securing position and the first non-securing position. When so moved, the first securing member may move across the central hole.

Each side wall portion may define a respective one of the side apertures. The side apertures in the side wall portions may be arranged opposite each other in alignment.

When the housing is inserted in the support member, each side aperture defined by the respective side wall portion may be aligned with the, or each, second aperture defined by the respective side member.

The side aperture in each side wall portion may be arranged in alignment with the second apertures in the, or the respective, side member.

The main element of the suspension article may extend through the side apertures in both side wall portions when said main element of the suspension article is received in the second apertures defined by the side members.

The main element of the suspension article may extend through the gap between the first internal portion and the second internal portion when said main element of the suspension article is received through the second apertures defined by the side members.

The space between both side wall portions and the respective adjacent side surface may receive a respective one of the second securing members. The side aperture defined by each side wall portion may extend across the respective side surface.

Each of the second securing members may be movable between its securing position and its non-securing position. When so moved, the second securing members may move across the respective side aperture.

The release means may be housed by the attaching arrangement. The release means may be housed by the housing. The attaching arrangement may define an access formation to allow access to the release means. The access formation may be an opening defined by the housing.

The securing device may include a reinforcing member to reinforce the external wall arrangement. The reinforcing member may be arranged on the external wall arrangement.

The reinforcing member may comprise a central reinforcing portion. The central reinforcing portion may extend across the central reinforcing portion of the external wall arrangement. The central reinforcing portion may be elongate.

The reinforcing member may comprise two opposed side reinforcing portions. Each side reinforcing portion may extend across a respective one of the side wall portions of the external wall arrangement.

Each side reinforcing portion may extend from the central reinforcing portion. Each side reinforcing portion may extend from a respective end of the central reinforcing portion. Each side reinforcing portion may be elongate.

The reinforcing member may be arranged on the external wall arrangement in alignment with the gap between the first and second internal portions. The external wall arrangement may define an elongate aperture in which the reinforcing member is received.

The securing device may include a mounting assembly for mounting the securing device to the support member. The mounting assembly may comprise a holding component for holding the latch member. The securing arrangement may further include a cover member for covering the holding component.

The mounting assembly may further include an elongate fastener to fasten the securing device to the support member. The fastener may be in the form of a metal fixing. The fastener may fasten the cover member to the support member. The fastener may fasten the holding component to the support member.

The holding component may include a fastening formation through which the fastener may extend to fasten the holding component to the support member.

The mounting assembly may include two of the fasteners. The mounting assembly may include two of the fastening formation. Each fastener may extend through a respective one of the fastening formations.

The cover member may comprise a lower portion. The lower portion may define a further slot through which the suspension member can extend.

The cover member may include locating formations for locating the cover member over the holding component. The locating formations may include a rear locating formation. The rear locating formation may extend upwardly and across the rear of the lower portion.

The locating formations may also include a front locating formation. The front locating formation may extend upwardly and across the lower portion. The locating formations may comprise a pair of the front locating formations. The front locating formations may extend upwardly at the corners of the lower portion.

The, or each, fastener may extend through locating apertures defined in the front and rear locating formations of the cover member to fasten the cover member across the holding component.

The support member may include installation indicators to allow the user to mark the positions to apply fasteners to the raised structure. Each installation indicator may comprise a respective notch defined adjacent each of the apertures defined by the central member.

The central wall portion may define an elongate central aperture in which the central reinforcing portion of the reinforcing member is received. Each side wall portion may define an elongate side aperture in which a respective one of the side reinforcing portions is received.

The central reinforcing portion may define a slot to receive the main element of the suspension article therethrough when the support member is in the first orientation. Each side reinforcing portion may define a slot to receive the main element of the suspension article therethrough when the support member is in the second orientation.

The attaching arrangement may include the reaction portion. The reaction portion may comprise the second internal portion. The second internal portion may define a recess to receive the urging member. The reaction portion may be opposite the access formation. The urging member may extend between the recess and the release member.

The second securing members may be arranged parallel to each other. The second securing members may be arranged transverse to the first securing member.

The mounting element of the suspension article may extend transverse to the main element.

The main element of the suspension article may have an elongate edge region extending along the inner region.

In the first version of the suspension article, the edge region may be thicker than the inner region. The edge region may be deformed, for example by folding the edge region, to form a hem. The edge region may comprise a hemmed edge region of the main element. The hem may extend the length of the main element.

The main element may have two of the edge regions arranged on opposite sides of the inner region. Each of said edge regions may be a hemmed edge region of the main element. Each of said hemmed edge regions may extend the length of the main element. The, or each, hemmed edge region may comprise a closed hem.

In a second version of the suspension article, the edge region may comprise a flange extending along the inner region. The flange may extend the length of the edge region.

The main element may have two of the flanges. Each edge region may comprise a respective flange. Each flange may extend the length of the respective edge region. The main element of the second version of the suspension article may have a substantially U-shaped end profile.

The suspension article may define a plurality of the securing openings. Where the securing device comprises two of the second securing members, each of the second securing members may be received in a respective one of the securing openings In the first version of the suspension article, the inner region may define the plurality of securing openings. The securing openings may be arranged one after another along the inner region of the main element. Each securing opening in the inner region may be in the form of a securing slot.

In the second version of the suspension article, the, or each, flange may comprise a plurality of formations to allow the main element to be deformed to a stowed condition at a desired location on the main element. Each of said formations may comprise a supplementary opening defined by the flange. Each supplementary opening defined by the flange may be in the form of a supplementary slot. Each of the supplementary openings may be aligned with a respective one of the securing openings defined by the inner region.

The edge of each flange adjacent a selected formation may be severed to allow the main element to be deformed to a stowed condition.

In the support member for use with the above described second version of the suspension article, the, or each, first aperture defined by the central member may have a shape that conforms to the shape of the end profile of the main element of the suspension article. The first aperture may have a substantially U-shaped configuration.

In a third version of the suspension article, the edge region of the main element may define the securing opening. Each of the opposite edge regions may define a respective securing opening. The securing opening defined in each edge region may be aligned with each other.

Where the suspension article defines a plurality of the securing openings, each of the edge regions may define a plurality of the securing openings. Each of the plurality of securing openings defined in one of the edge regions may be aligned with a respective one of the plurality of securing openings defined in the opposite edge region.

In the third version of the suspension article, the edge region of the main element may be a hemmed edge region. The securing opening may be defined through the hem of the edge region.

The main element may have opposite outer edges, and opposite edge regions extending inwardly from the outer edges. The main element may have opposite faces.

Each of the edge regions may define a plurality of securing openings in the form of securing slots extending inwardly from the outer edges. The securing openings may extend through the main element between the opposite faces. The plurality of securing openings may be arranged in a plurality of aligned pairs of securing openings.

Each edge region of the main element may be a hemmed edge region. Each of the securing openings may be defined through the hem of the respective edge region.

The, or each, securing opening may be a slot defined through the edge region. The, or each, hemmed edge region may be an open hem.

In the third version of the suspension article, the first securing member may be provided at one side of the hole defined by the latching element. Where each edge region of the main element defines respective securing openings, the latching element may comprise two of the first securing members.

The, or each, first securing member may extend into the hole at one, or a respective, side of the hole. The first securing members may be provided on respective opposite sides of the hole.

In the third version, when the suspension article is secured to the securing device, the main element may be deformed to a stowed condition at a desired location on the main element. Said desired location may be at an aligned pair of the securing openings. The main element may be so deformed by bending the main element to provide a bent region, wherein the bent region extends along the support member.

At least one embodiment of the invention will now be described by way of example only, with reference to the accompanying drawings, in which.

Figure 1:
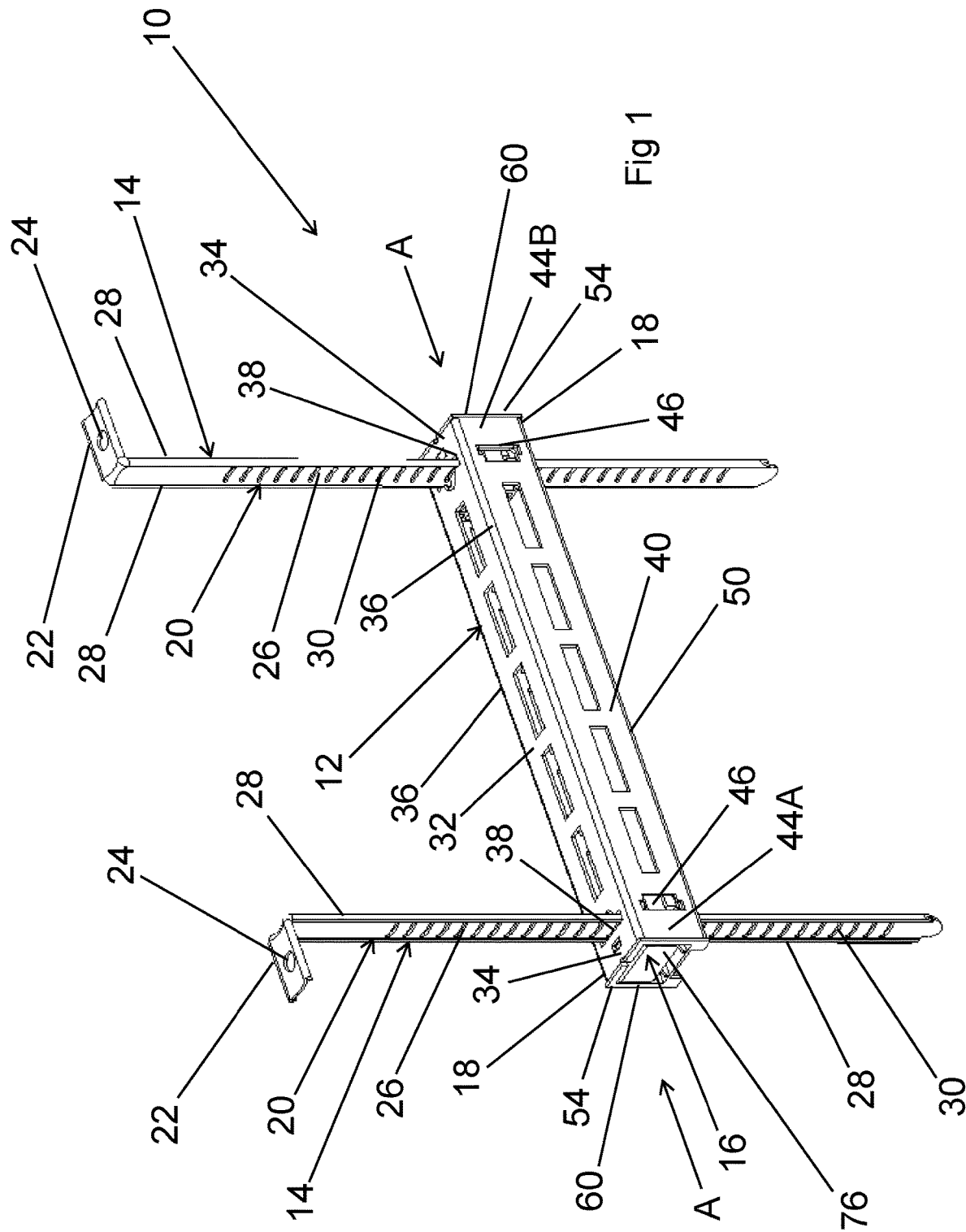
FIG. 1 is a perspective view from above of a suspension assembly comprising a support member in a first orientation.

FIGS. 1 to 5 of the drawings show a suspension assembly 10 for supporting items such as pipes or electrical cabling. The suspension assembly 10 comprises a support member 12 in the form of an elongate strut having opposite open ends 18. The suspension assembly 10 further includes two elongate suspension articles 14 for suspending the support member 12 from a raised structure (not shown), such as a roof beam or ceiling.

A respective securing device 16 is mounted at each end 18 of the support member 12. The securing devices 16 are attached to the support member 12 within each end 18 thereof.

A respective one of the suspension articles 14 extends through the support member 12 at each end 18, and through each of the securing devices 16. The suspension articles 14 are secured to the securing devices 16 as explained below, thereby securing the support member 12 to the suspension articles 14.

Figure 6:
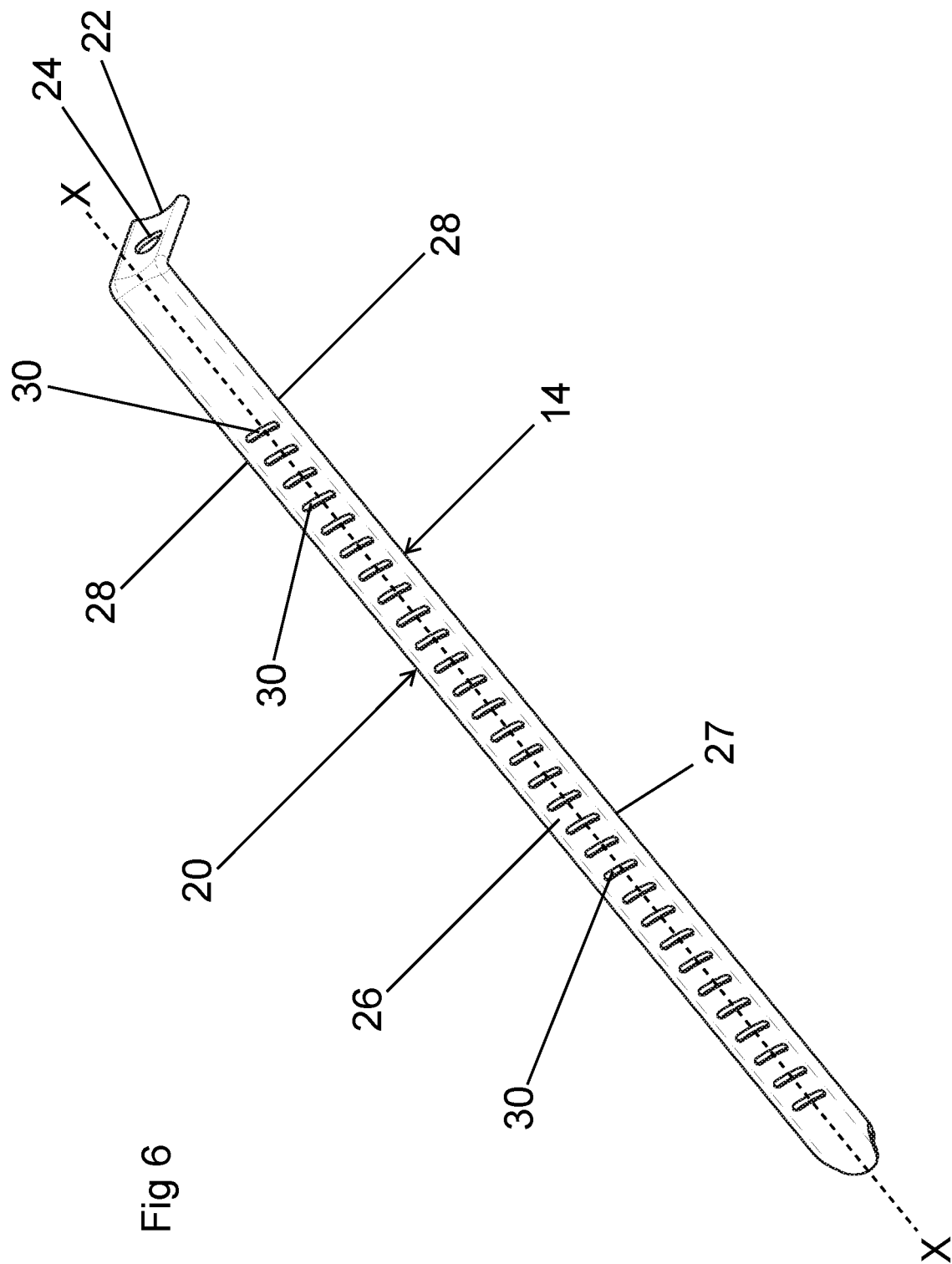
FIG. 6 is a perspective view from one direction of a first version of an elongate suspension article.
Figure 7:
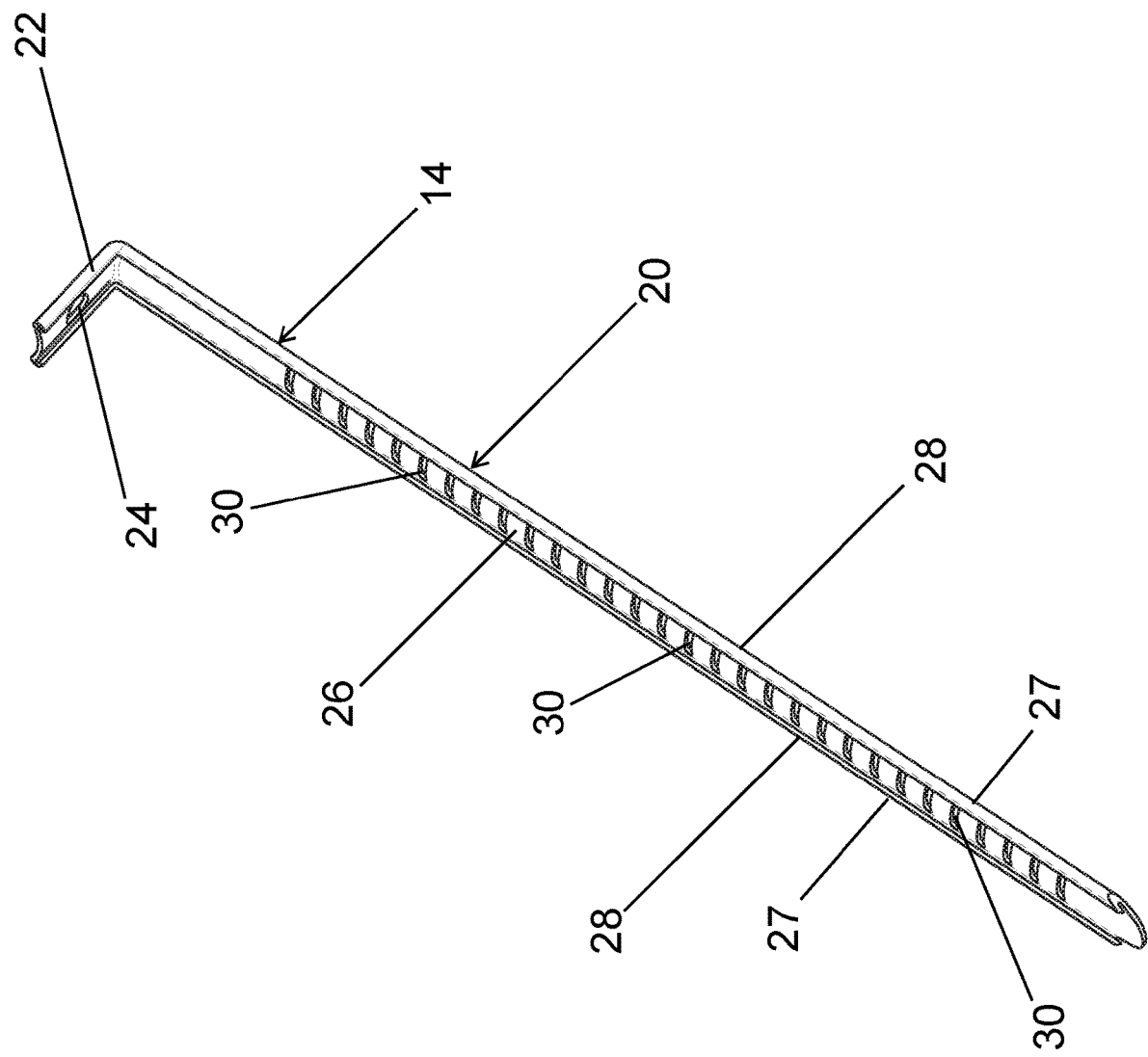
FIG. 7 is a perspective view from an opposite direction of the elongate suspension article.

Referring to FIGS. 6 and 7, each suspension article 14 is in the form of a metallic strap, and comprises an elongate main element 20. Each suspension article 14 further includes a mounting element 22 for mounting the suspension article 14 on the raised structure.

Figure 2:
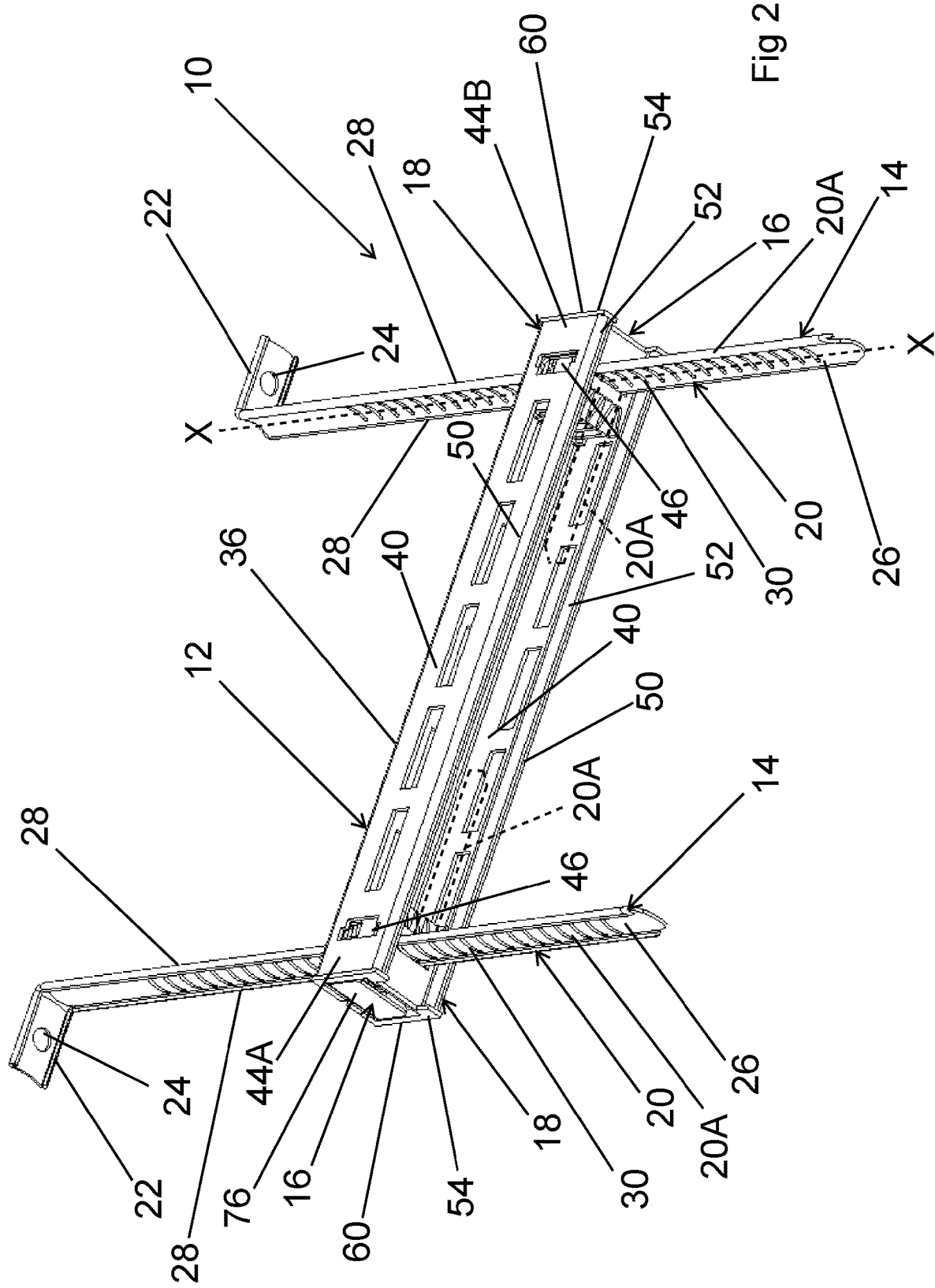
FIG. 2 is a perspective view from below of a suspension assembly comprising a support member in a first orientation.

When the suspension articles 14 are secured to the securing devices 16, a lower region 20A of the main element 20 can be deformed to a stowed condition, as shown by the broken lines in FIG. 2. The lower region 20A is deformed by bending it so that it extends along the support member 12, as shown, and stowed within the support member 12 between the side members 40.

The mounting element 22 extends from the main element 20 transverse thereto, for example at a right angle to the main element 20. In the embodiment shown, the mounting element 22 defines a mounting hole 24 through which a fastener, such as a screw, can be inserted to mount the suspension article 14 on the raised structure.

The main element 20 has a longitudinally extending main axis X-X. An elongate inner region 26 of the main element 20 extends along the main axis X-X. The inner region 26 of the main element 20 is curved about the main axis X-X.

The main element 20 has opposite elongate edge regions 28 extending along the inner region 26. Each of the opposite edge regions 28 of the main element 20 is folded to form hems 27, thereby providing a hemmed edge region 28. The combination of the curved main element 20 and hemmed edge regions 28 provide stability and strength to the suspension article 14.

The suspension article 14 defines a plurality of securing openings, in the form of securing slots 30, each securing slot 30 extending across the inner region 26 of the main element 20. The securing slots 30 are arranged one after another along the inner region 26. The purpose of the securing slots 30 in the inner region 26 of the main element 20 is explained below.

Figure 8:
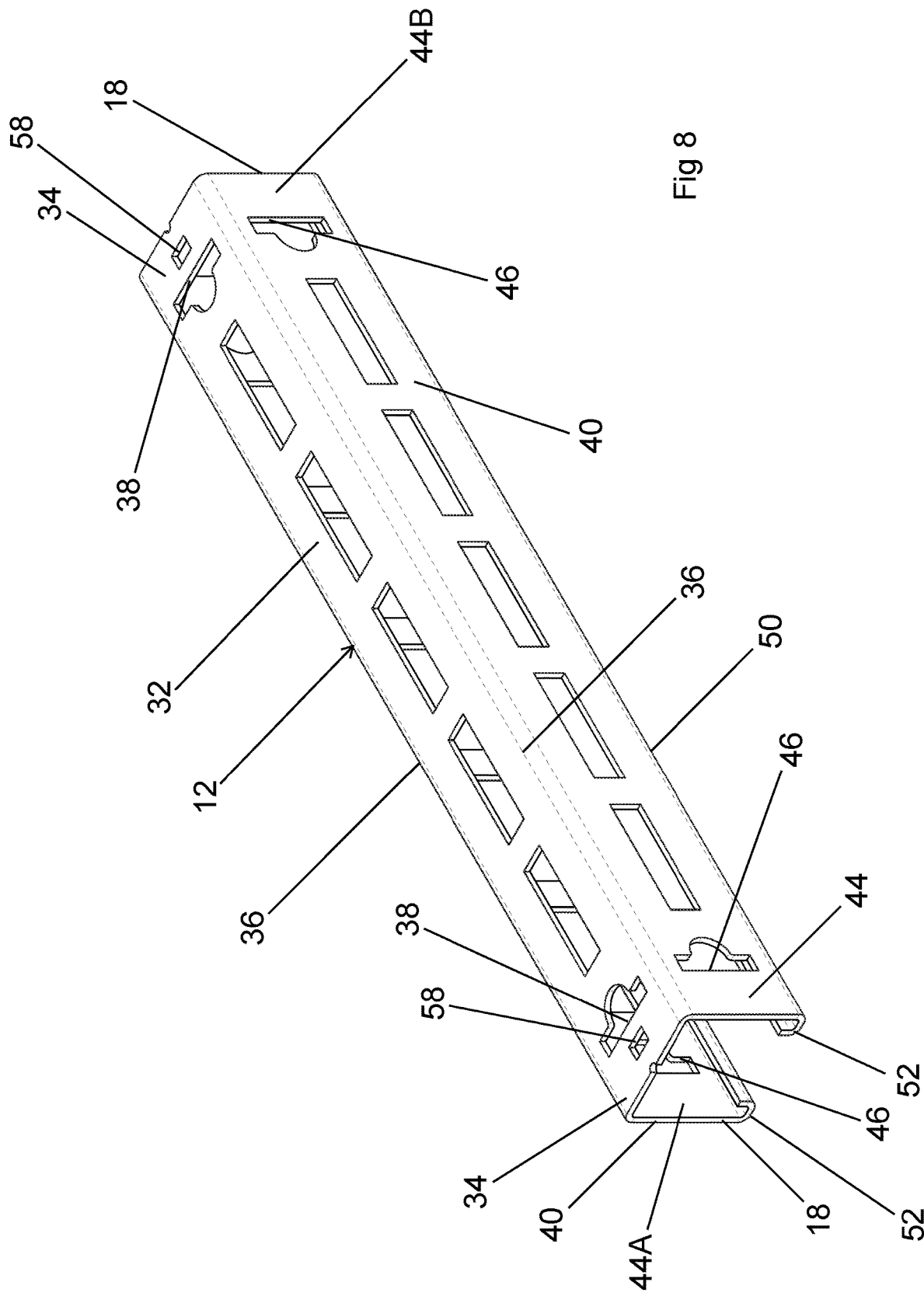
FIG. 8 is a perspective view of the support member in the first orientation.
Figure 9:
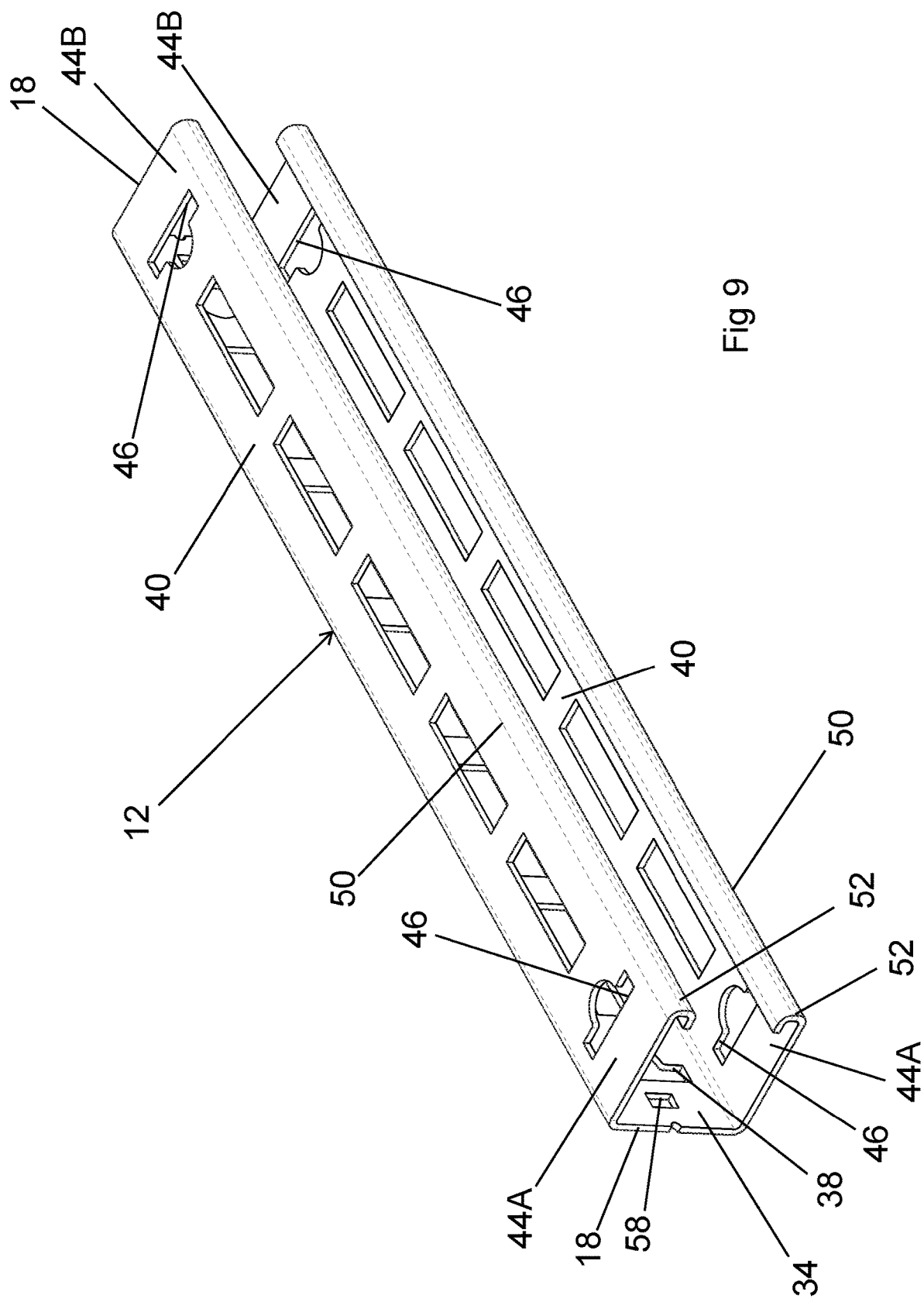
FIG. 9 is a perspective view of the support member in the second orientation.
Figure 10:
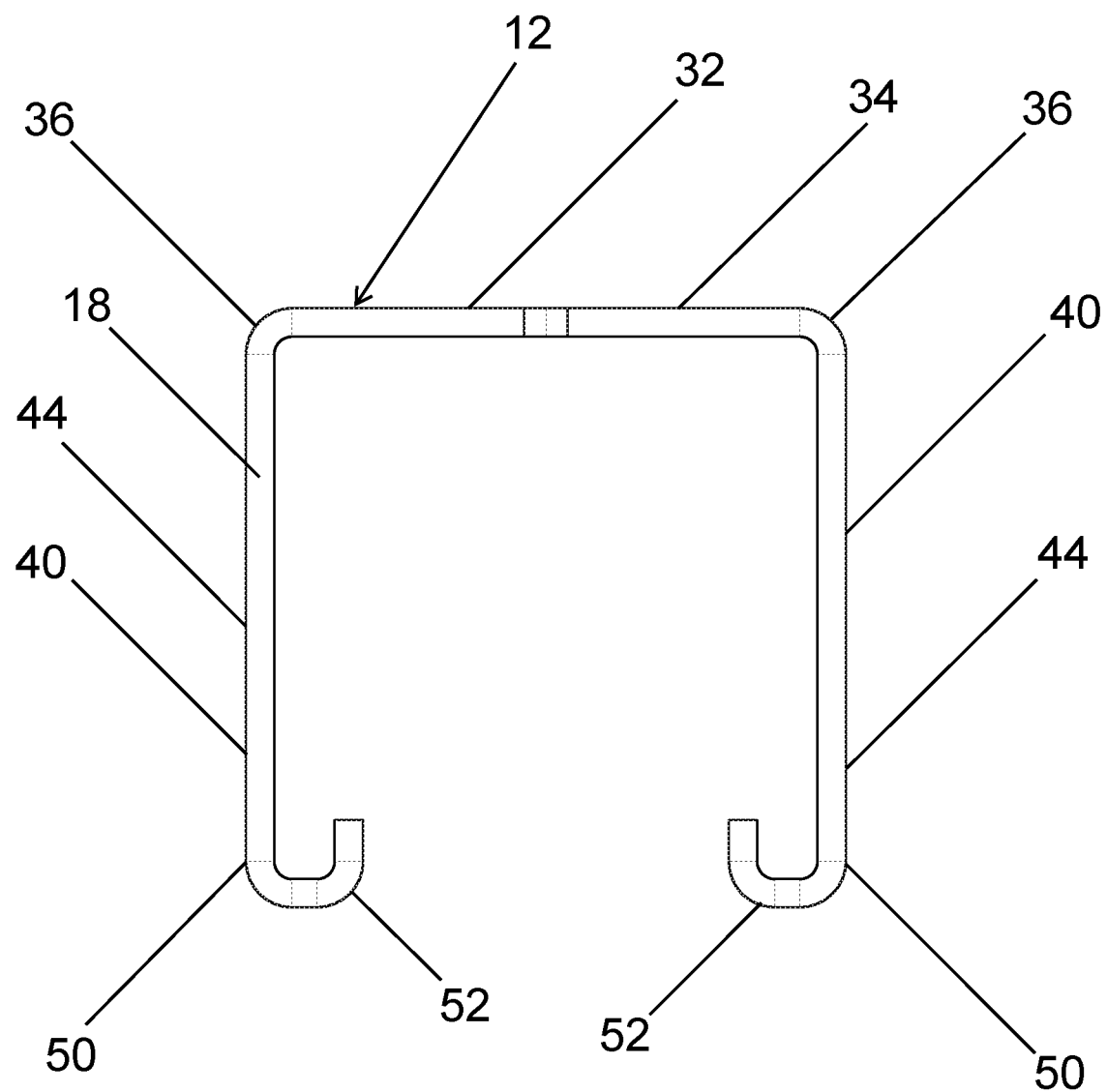
FIG. 10 is an end view of the support member.
Figure 11:
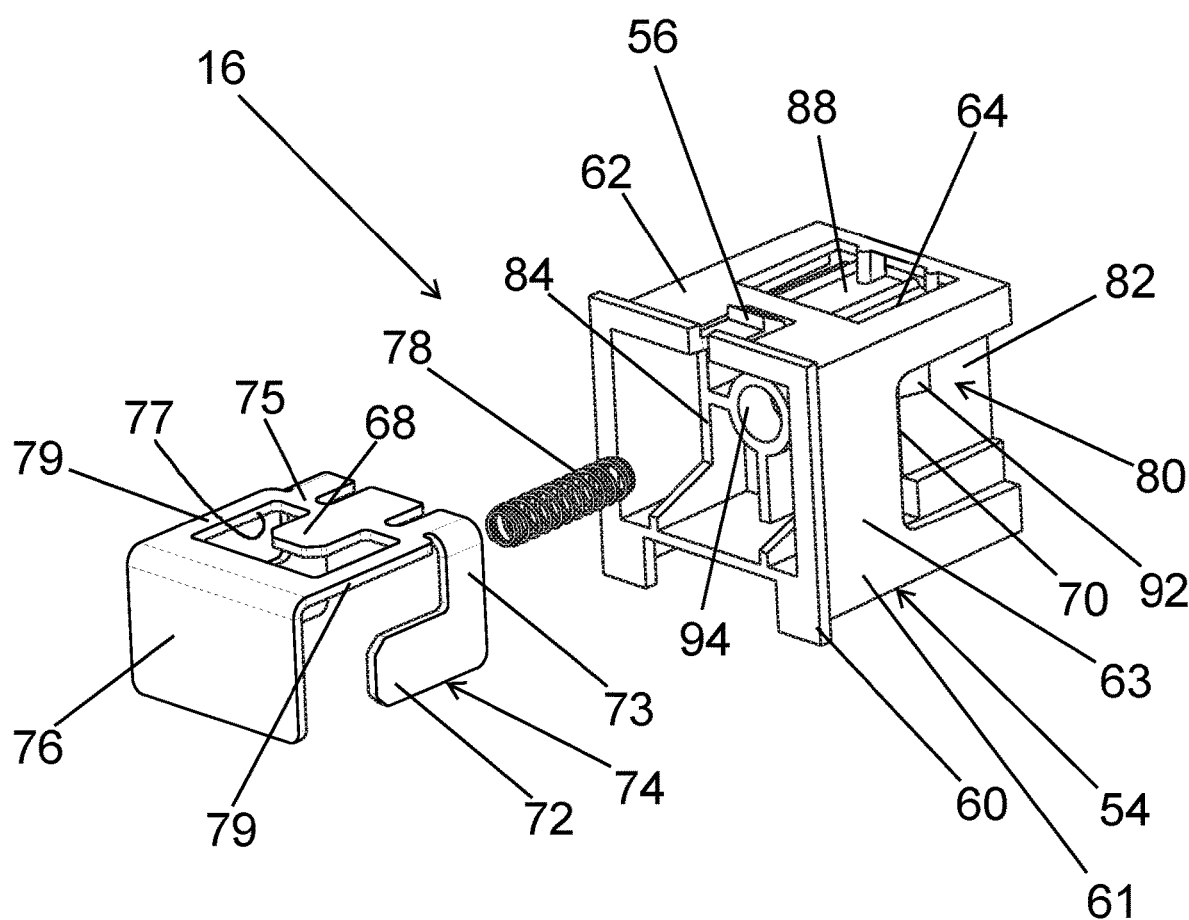
FIG. 11 is an exploded view of a securing device.

Referring to FIGS. 8, 9 and 10, the support member 12 comprises a substantially planar central member 32 having opposite end regions 34 and opposite side edges 36. Each end region 34 of the central member 32 defines a respective first aperture 38.

The first apertures 38 are in the form of slots, and can receive therethrough the main element 20 of a respective one of the suspension articles 14, as described below.

The support member 12 further includes two opposite side members 40, each side member 40 extending from a respective one of the side edges 36. Each side member 40 has opposite end regions 44A, 44B and a free side edge 50.

The support member 12 can be manufactured by a metal forming process which involves bending the side members 40 relative to the central member 32 to form the edges 36 between the central and side members 32, 40. The side members 40 are bent relative to the central members 32 to a position in which the side members 40 extend at right angles to the central member 32.

Each end region 44 of both side members 40 defines a respective second aperture 46 in the form of a slot. The second apertures 46 at the end region 44A of each side member 40 are arranged opposite each other in alignment. Similarly, the second apertures 46 at the opposite end region 44B of each side member 40 are arranged opposite each other in alignment.

Each side member 40 is integrally attached along a respective one of the side edges 36 of the central member 32. The opposite free side edge 50 of each side member 40 is deformed inwardly into a return formation 52. The return formations 52 extend along the respective side edge 50 of each side member 40.

The side members 40 extend from the central member 32 in the same direction as each other, thereby forming a generally U shaped component.

The suspension articles 14 can suspend the support member 12 in a first orientation (shown in FIGS. 1, 2, 4, 5 and 8), in which the central member 32 faces upwards. In the first orientation of the support member 12, the suspension articles 14 are received through the first apertures 38 in the central member 32 and secured thereto by the securing device 16, as explained below.

The suspension articles 14 can suspend the support member 12 in a second orientation (shown in FIGS. 3 and 9), in which one of the side members 40 faces upwards to support items thereon. In the second orientation of the support member 12, the suspension articles 14 are received through the second apertures 46 in both of the side members 40 and secured to the support member 12 by the securing device 16, as also explained below.

Referring to FIGS. 11 to 18, each securing device 16 comprises an attaching arrangement in the form of a housing 54. The housing 54 of each securing device 16 is received in a respective one of the ends 18 of the support member 12. The housing 54 is received between the central member 32 and the return formations 52 of the side members 40, thereby attaching the securing device 16 to the support member 12.

Each housing 54 includes a resiliently deformable detent formation 56, which is received in a receiving opening 58 defined in the end regions 34 of the central member 32 (see FIG. 8).

The housing 54 has an end edge provided with an outwardly extending stop member, in the form of a flange 60. When the securing device 16 is received in the end of the support member 12, the flange 60 of each housing 54 engages the respective end 18 of the support member 12, thereby ensuring the housing 54 is properly inserted into the support member 12.

The housing 54 comprises an external wall arrangement 61 comprising a central wall portion 62 and two opposite side wall portions 63. The central wall portion 62 extends between the side wall portions 63. The central wall portion 62 defines a hole 64. When both of the housings 54 are inserted in the support member 12, the hole 64 in the central wall portion 62 of each housing 54 is aligned with the first apertures 38 defined by the central member 32.

The housing 54 further includes a further wall member 65 opposite the central wall portion 62. The further wall member defines a further hole 66 aligned with the hole 64.

This alignment allows the main elements 20 of the suspension articles 14 to be received through the hole 64 in the central wall portion 62 and through the further hole 66 of the further wall member 65 when the support member 12 is in the first orientation and said main elements 20 are received in the first apertures 38 defined by the central member 32.

The side wall portions 63 of each housing 54 define respective side holes 70. The side holes 70 in the side wall portions 63 are arranged opposite each other in alignment.

When the housings 54 are inserted in the support member 12, the side holes 70 in the side wall portions 63 are arranged in alignment with the second apertures 46 in both side members 40. This alignment allows the main elements 20 of the suspension articles 14 to be received through the side holes 70 in both side wall portions 63.

The securing device 16 further includes a unitary latching element 74 comprising first and second securing members 68, 72 in the form of first and second latch members. The latching element 74 comprises two of the second securing members 72 arranged opposite each other with the first securing member 68 therebetween. The first securing members 68 are offset from the second securing members 72, and arranged at a right angle thereto.

The second securing members 72 are attached to the first securing member 68 by attaching elements 73. Each of the second securing members 72 is arranged at a right angle relative to the first securing member 68. The second securing members 72 extend from the attaching elements in the same direction as each other and in the same direction as the first securing member 68.

The latching element 74 is movable between a locking condition, in which the first and second securing members 68, 72 are in respective securing positions, and a non-locking condition, in which the first and second securing members 68, 72 are in respective non-securing positions. The securing and non-securing positions of the first and second securing members 68, 72 are discussed below.

The latching element 74 has an upper region 75 defining a hole 77. The first securing member 68 extends into the hole 77 centrally thereof. The latching element 74 further includes a release tab 76 connected to the first securing member 68 by a pair of connecting members 79. The connecting members 79 define the hole 77 therebetween.

The release tab 76 is substantially planar and extends at right angles relative to the first and second securing members 68, 72. As shown in FIGS. 1 and 2, the visible latching element 74 is in the locking condition.

Figure 3:
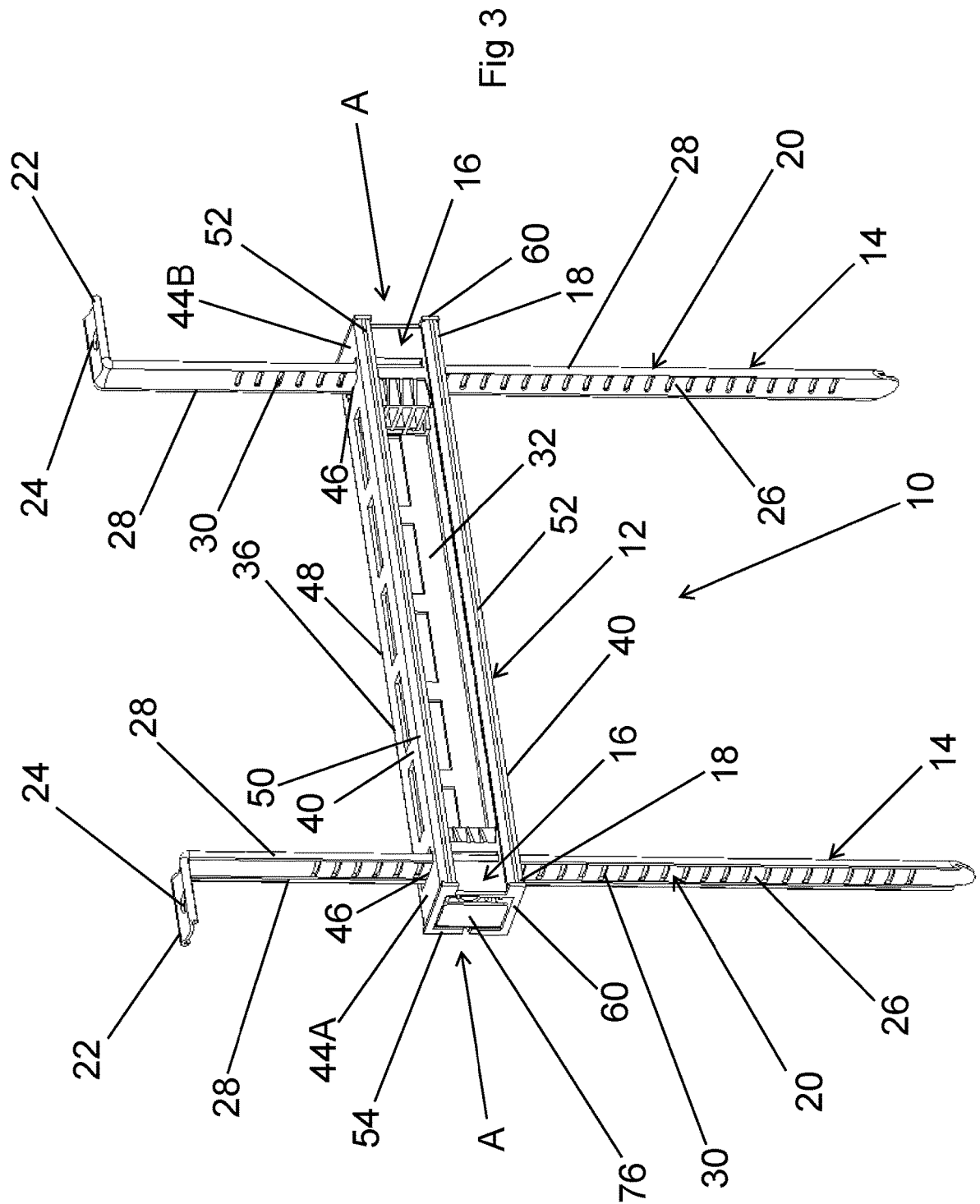
FIG. 3 is a perspective view of the suspension assembly showing the support member in a second orientation.
Figure 4:
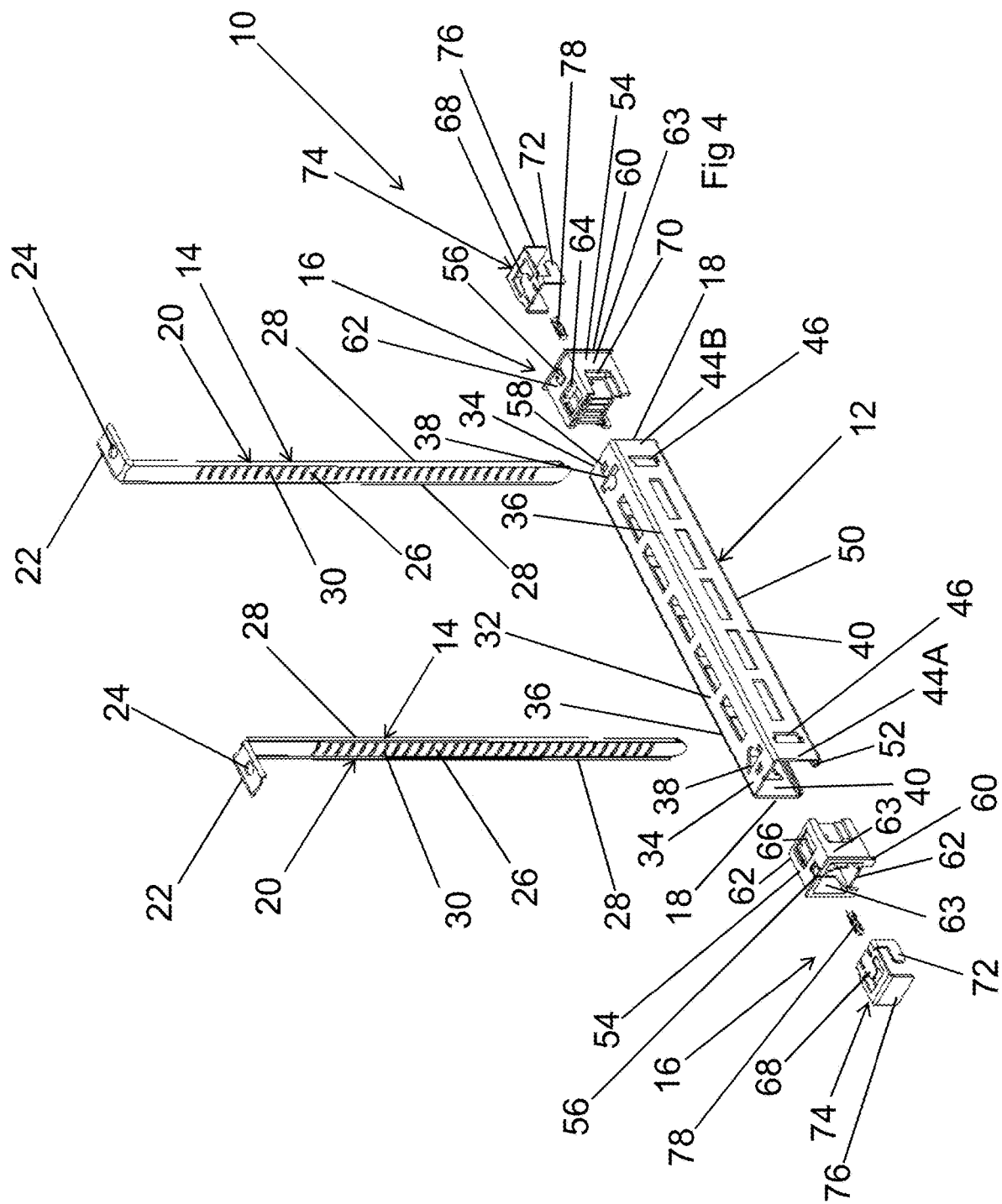
FIG. 4 is an exploded view from above of the suspension assembly.
Figure 5:
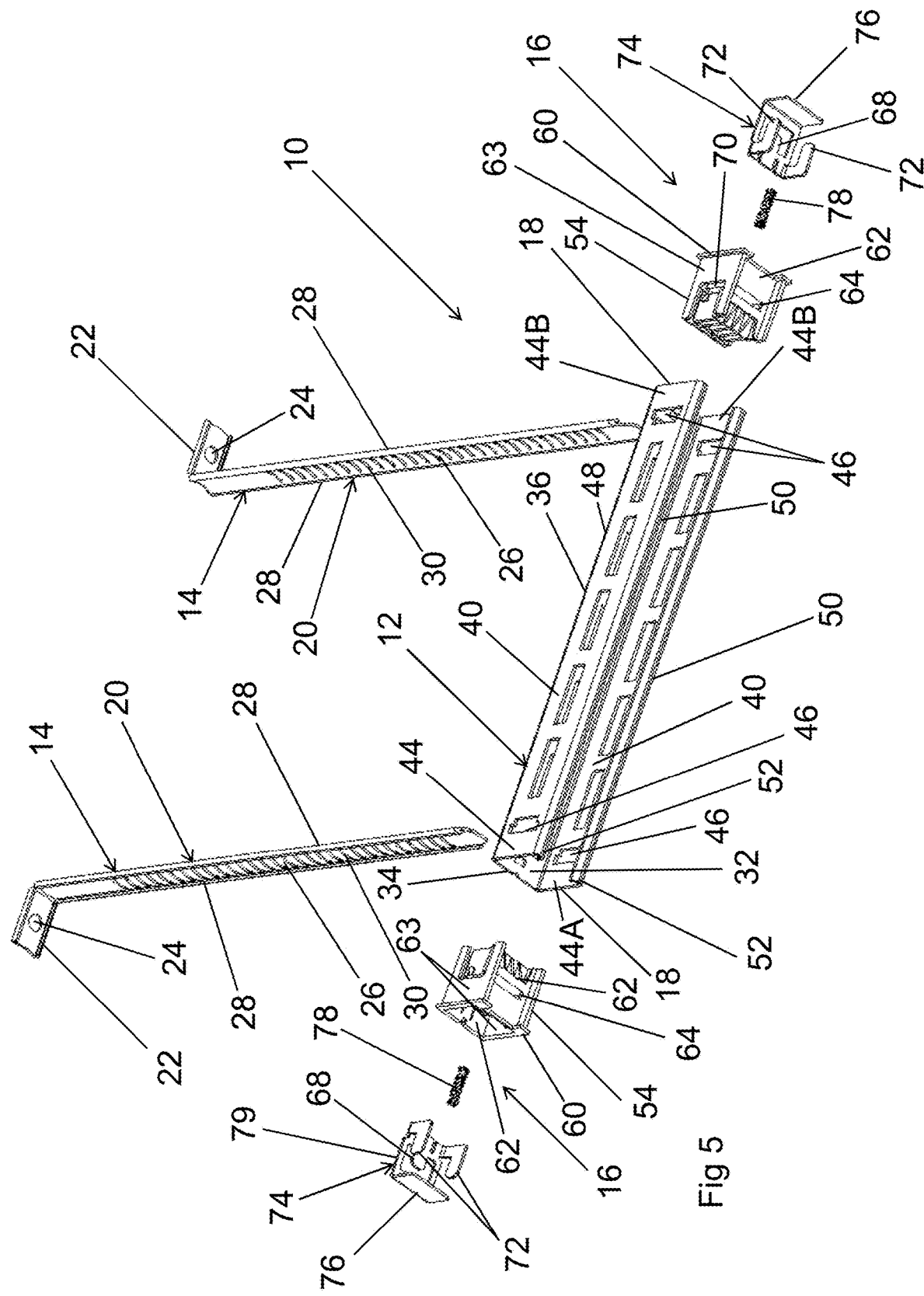
FIG. 5 is an exploded view from below of the suspension assembly.

The release tab 76 can be pressed inwards of the support member 12, i.e. in the case of the latching element 74 visible in FIGS. 1 and 2, the release tab 76 can be pressed in the direction indicated by the arrows A in FIGS. 1 and 3. When the release tab 76 is so pressed, the latching element 74 is moved to the non-locking condition.

An urging member 78, in the form of a spring, extends between the latching element 74 and the housing 54. The urging member 78 urges the first and second securing members 68, 72 to their respective securing positions, i.e. in the case of the latching element 74 visible in FIGS. 1 and 2, the urging member 78 urges the latching element 74 to the locking condition, in the respective opposite directions to the directions indicated by the arrows A.

The housing 54 further includes an internal arrangement 80 comprising a first internal portion in the form of a guide portion 82 for guiding the latching element 74 between the securing and non-securing positions of the first and second securing members 68, 72.

The internal arrangement 80 further includes a second internal portion in the form of a reaction portion 84 (see FIG. 18) to provide a reaction force to the urging member 78.

A gap 86 is defined between the guide portion 82 and the reaction portion 84. The gap 86 is aligned with the central hole 64 in the central wall portion 62, and is also aligned with the side holes 70 defined by the side wall portions 63. When the securing devices 16 are attached to the support members 12 at each of the ends 18 thereof, the gaps 86 are aligned with the first apertures 38 in the central member 32, and with the second apertures 46 in the side members 40.

The guide portion 82 has a central surface 88 adjacent the central wall portion 62. The central surface 88 is spaced from the central wall portion 62 by a distance sufficient to receive the central securing member 68 between the central wall portion 62 and the central surface 88. The central hole 64 defined by the central wall portion 62 extends across the central surface 88.

The guide portion 82 has a pair of opposite side surfaces 90 extending perpendicular to the central surface 88. The side surfaces 90 are arranged adjacent the respective side wall portion 63. Each side surface 90 is spaced from the side wall portion 63 by a distance sufficient to receive the respective second securing member 72 between the side wall portions 63 and the adjacent side surfaces 90. Each of the side holes 70 defined by the side wall portions 63 extends across the respective side surface 90.

The latching element 74 is held within the housing 54 in a position in which the first securing member 68 is disposed between the central wall portion 62 and the first surface 88, and in which each second securing members 72 is disposed between the side wall portions 63 and the respective second surface 90.

Each of the side surfaces 90 also includes a projecting catch 92. When the latching element 74 is held within the housing 54, the catches 92 engage the attaching members 73, thereby preventing inadvertent removal of the latching element 74 from the housing 54.

When the latching element 74 is in the locking condition, the first and second securing members 68, 72 extend across the gap 86, and can be received in a selected securing slot 30 in the main element 20 of the suspension article 14. When the latching element 74 is in the non-locking condition, the first and second securing members 68, 72 are retracted and do not extend across the gap 86.

When the support member 12 is in the first orientation (see FIGS. 1 and 2), the main elements 20 of the suspension articles 14 can be received through the first apertures 38, and through the gap 86 between the guide portion 82 and the reaction portion 84. The latching elements 74 of each securing devices 16 can be moved to the locking conditions, so that the first securing members 68 extend through a selected one of the securing slots 30 in the main elements 20. This secures the support member 12 in its first orientation to the suspension articles 14.

Alternatively, the support member 12 can be arranged in the second orientation (see FIG. 3). The main elements 20 of the suspension articles 14 can be received through the second apertures 46, and through the gap 86. The latching elements 74 can be moved to the locking conditions, so that the opposite second securing members 72 extend through a selected two of the securing slots 30 in the main elements 20. This secures the support member 12 in its second orientation to the suspension articles 14.

The reaction portion 84 defines a recess 94 facing the release tab 76. The urging member 78 is located in the recess 94 and extends therefrom to engage the release tab 76, thereby urging the latching elements 74 to their locking conditions in the directions opposite to the directions indicated by the arrows A in FIGS. 1 and 3.

In order to install the suspension assembly 10, the securing devices 16 are inserted into the ends of the support member 12. Each suspension article 14 is mounted on the raised structure by passing a fastener, such as a screw, through the mounting hole 24 into the raised structure.

The support member 12 can be arranged in the first orientation shown in FIG. 1. The user then pushes the release tab 76 of each securing device 16 inwardly of the support member 12 to push the latching element 74 to the non-locking condition.

Pushing the latching element 74 in this way moves the first and second securing members 68, 72 to their respective non-securing positions. The main elements 20 of the suspension articles 14 can then be inserted through the first apertures 38 in the central member 32 and through the central holes 64 in the central reinforcing portions 62 of the securing devices 16.

The position of the support member 12 along the suspension articles 14 can be adjusted. When the desired position of the support member 12 is reached, the user lets go of the release tabs 76 so that the latching elements 74 are urged by the respective urging members 78 to their locking conditions.

The urging of the latching elements 74 by the urging members 78 moves the first and second securing members 68, 72 to their respective securing positions. The first securing members 68 move through the securing slots 30 in the main elements 20 of the suspension articles 14, thereby securing the support member 12 to the suspension article 14.

Alternatively, the support member 12 is arranged in the second orientation shown in FIG. 2. The release tabs 76 of both securing devices 16 are then pressed inwardly by the user. As a result, the latching element 74 is moved to the non-locking condition, thereby moving both of the second securing members 72 to their non-securing positions.

The main elements 20 of the suspension articles 14 can then be inserted through both of the opposite second apertures 46 at each end of the two side members 40 and through the side holes 70 in the side wall portions 63 of the securing devices 16. The support member 12 can be positioned along the main elements 20 of the suspension article 14 to a desired position.

The user can then let go of the release tabs 76 so that the urging members 78 move the latching elements 74 to their locked positions, thereby moving both second securing members 72 of each latching element 74 to their respective securing positions.

When so moved, the second securing members 72 extend through the securing slots 30 in the main elements 20 of the suspension articles 14, thereby securing the support member 12 to the suspension article 14.

There is thus described a suspension assembly 10, in which the support member 12 can be suspended by the suspension articles 14 in either the first orientation or the second orientation.

In the first orientation, the main elements 20 of the suspension articles 14 extend through the apertures in the central member 32. In the second orientation, the main elements 20 of the suspension articles 14 extend through the apertures in both of the side members 40.

The embodiment described above provides the advantage that a single securing device 16 secures the suspension articles 14 to the support member 12 in either the first or the second orientation.

Various modifications can be made without departing from the scope of the invention.

Figure 19:
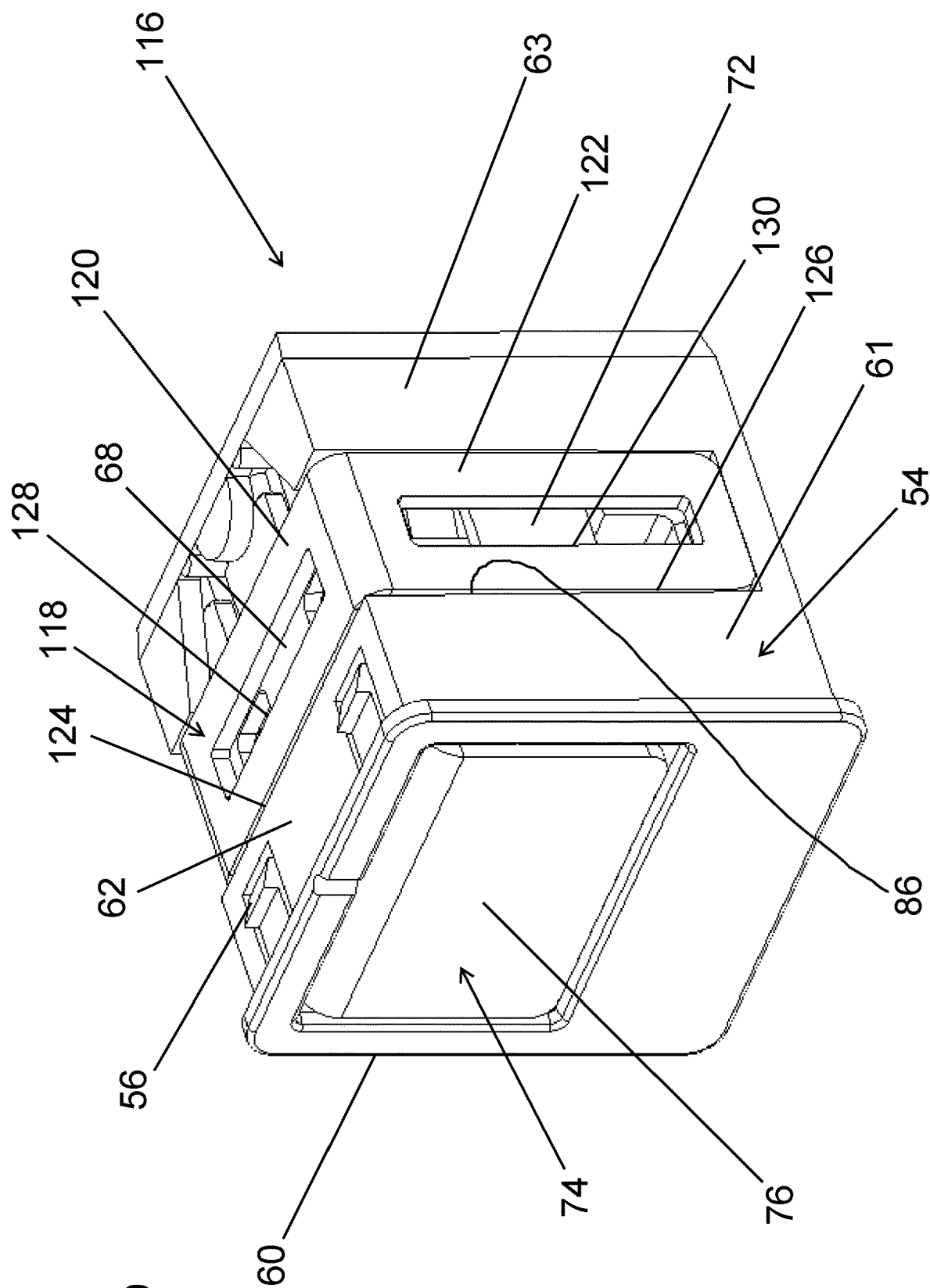
FIG. 19 shows a modified version of the securing device.
Figure 20:
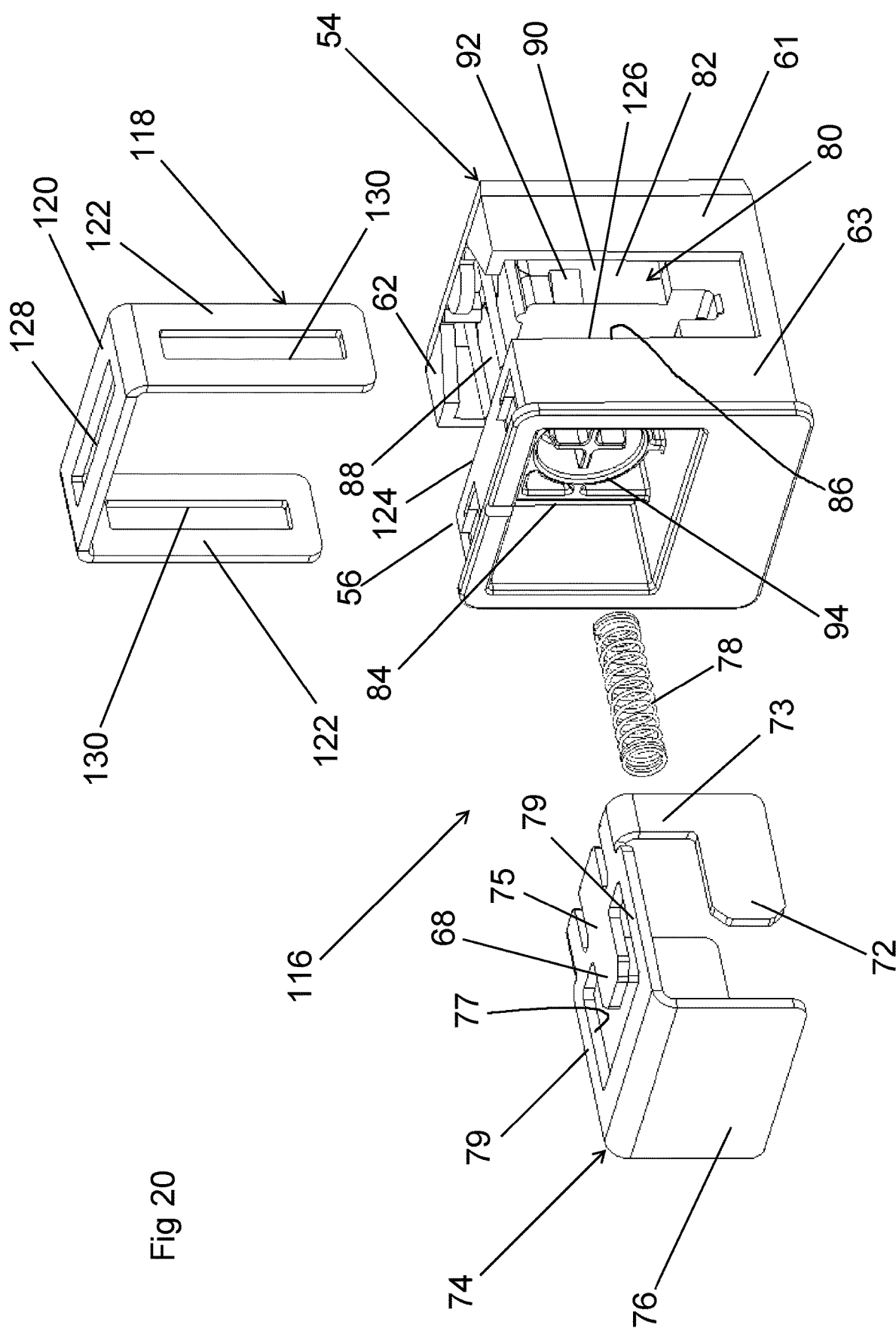
FIG. 20 is an exploded view of the securing device shown in FIG. 19.

FIGS. 19 and 20 show a modified securing device, generally designated 116. The securing device 116 is mainly the same as the securing device 16 and comprises all the features of the securing device 16. Where the features of the securing device 116 are visible in FIGS. 19 and 20, those features are designated with the same reference numerals as the corresponding features shown in FIGS. 11 to 18.

The securing device 116 can be used in place of the securing device 16 in the suspension assembly 10 shown in FIGS. 1 to 5.

The securing device 116 differs from the securing device 16 in that the securing device 116 comprises a substantially U shaped reinforcing member 118 extending around the housing 54. The reinforcing member 118 comprises an elongate central reinforcing portion 120 extending across the central wall portion 62 and two opposite elongate side reinforcing portions 122 extending from the opposite ends of the central reinforcing portion across the side wall portions 63.

The reinforcing member 118 is arranged on the external wall arrangement 61 in alignment with the gap 86 between the guide portion 82 and the reaction portion 84.

The central wall portion 62 defines an elongate central aperture 124 across the gap 86. The central reinforcing portion 120 of the reinforcing member 118 is received in the central aperture 124. Each side wall portion 63 defines a respective elongate side aperture 126 across the gap 86. A respective one of the side reinforcing portions 122 is received in each of the side apertures 126.

The central reinforcing portion 120 defines an entry slot 128 to receive the main element 20 of the suspension article 14 therethrough when the support member 12 is in the first orientation (see FIGS. 1 and 2). Each side reinforcing portion 122 defines a slot 130 to receive the main element 20 of the suspension article 14 therethrough when the support member 12 is in the second orientation (see FIG. 3).

In the embodiment described herein, the reinforcing member 118 provides the advantage that it helps prevent the first and second securing members 68, 72 being pulled through the central or side members 32, 40 when a load is applied to the support member 12.

Figure 21:
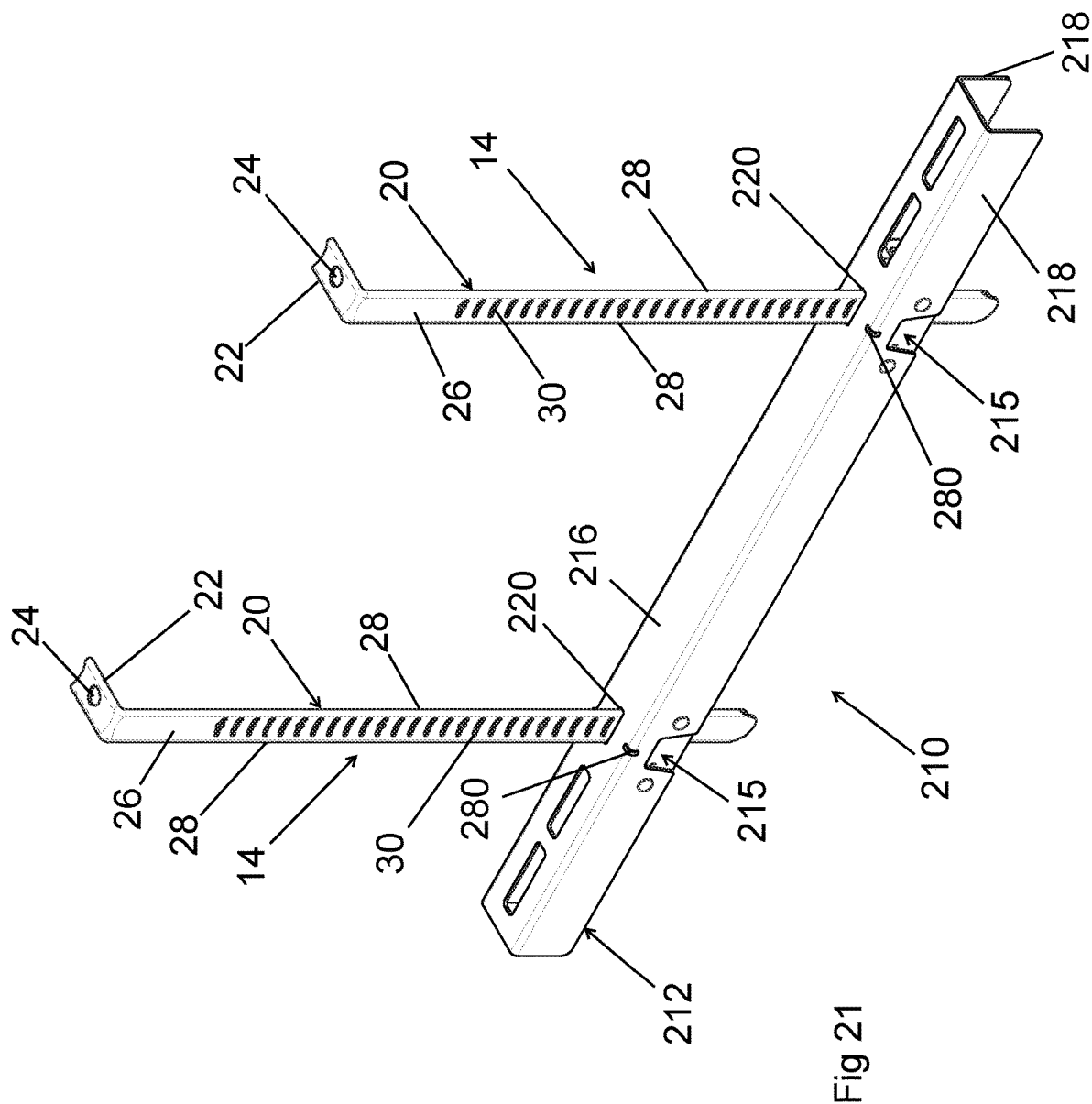
FIG. 21 is a perspective view of a further suspension assembly.
Figure 22:
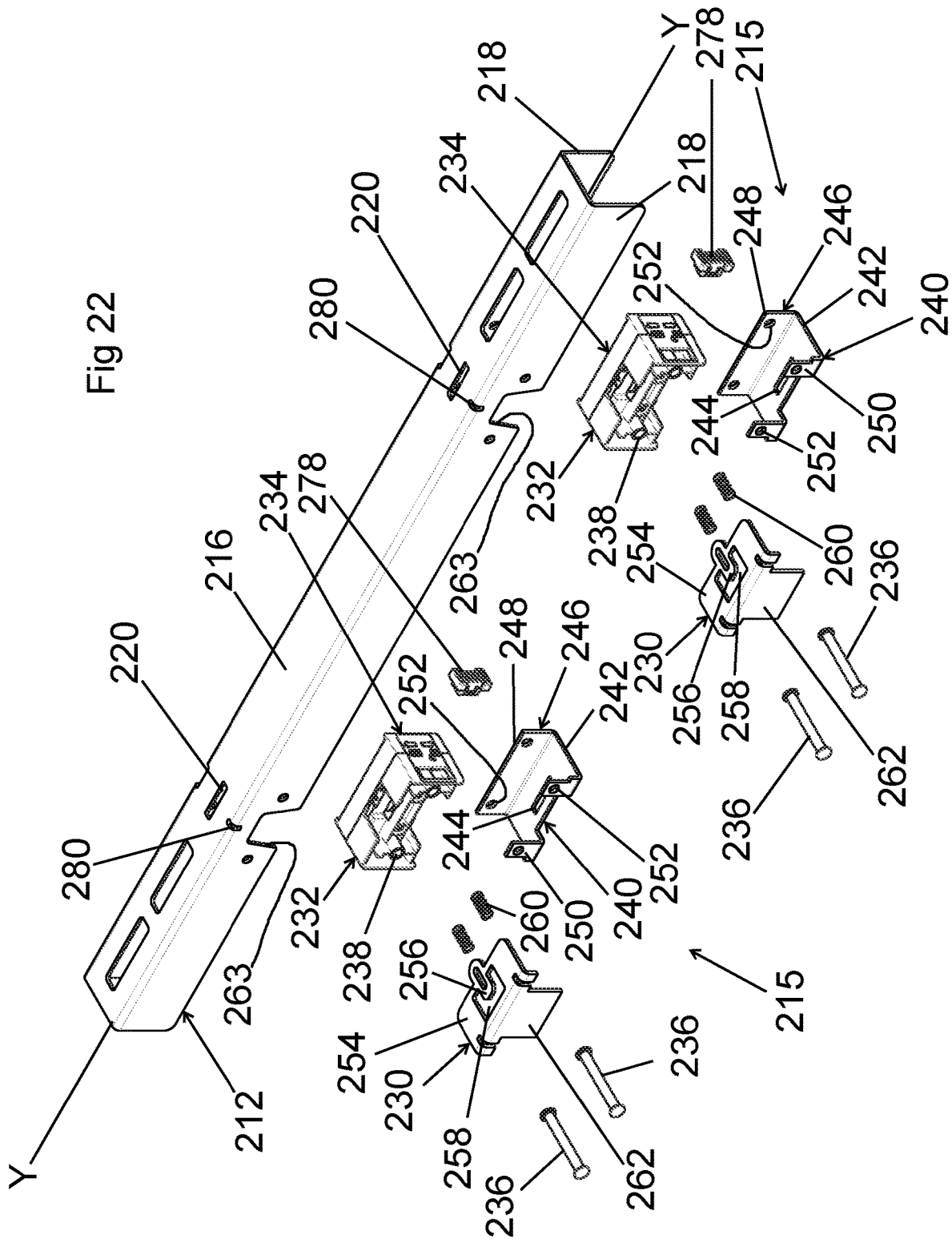
FIG. 22 is a perspective exploded view of part of the further suspension assembly.
Figure 23:
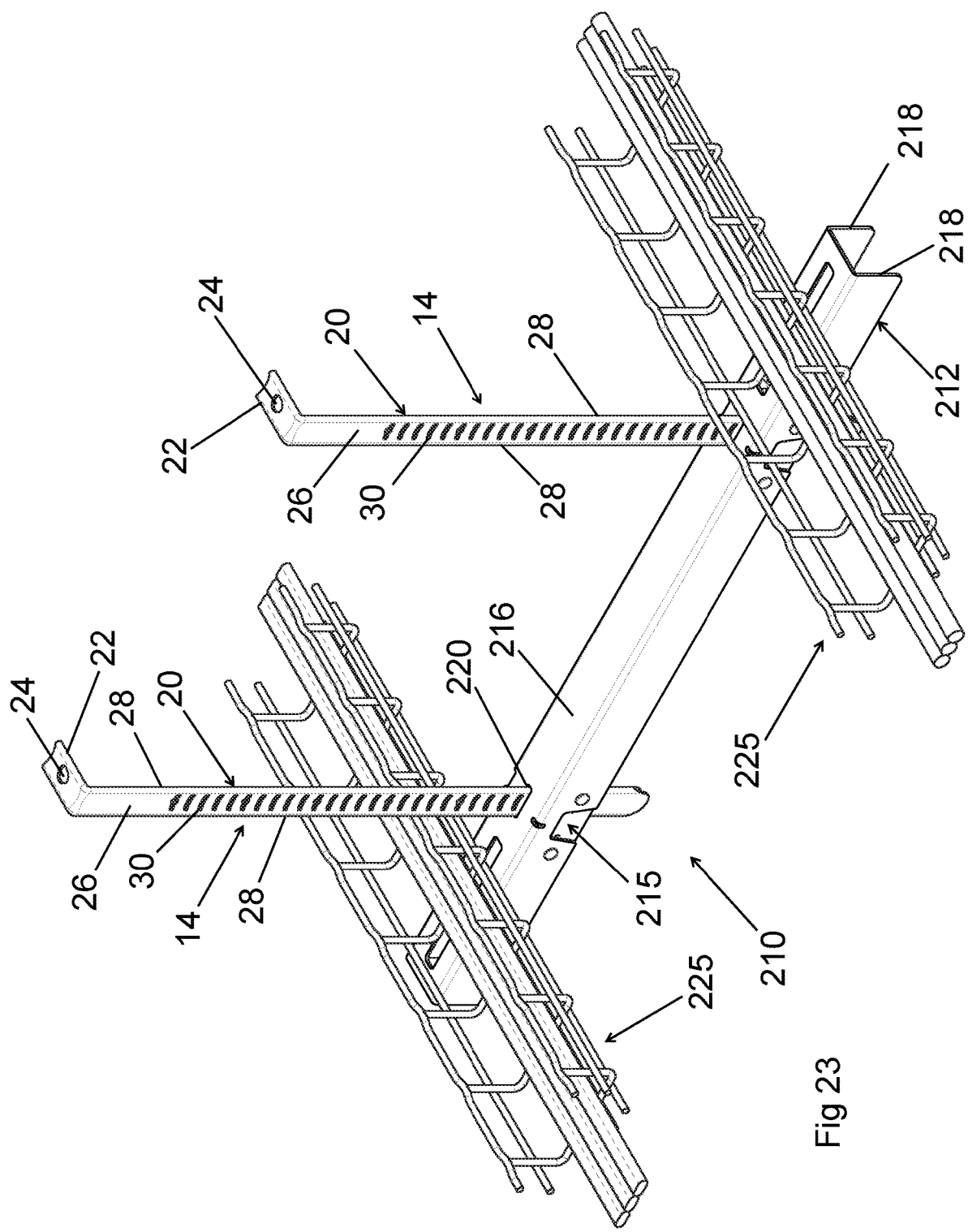
FIG. 23 is a perspective view of the further suspension assembly in use.
Figure 24:
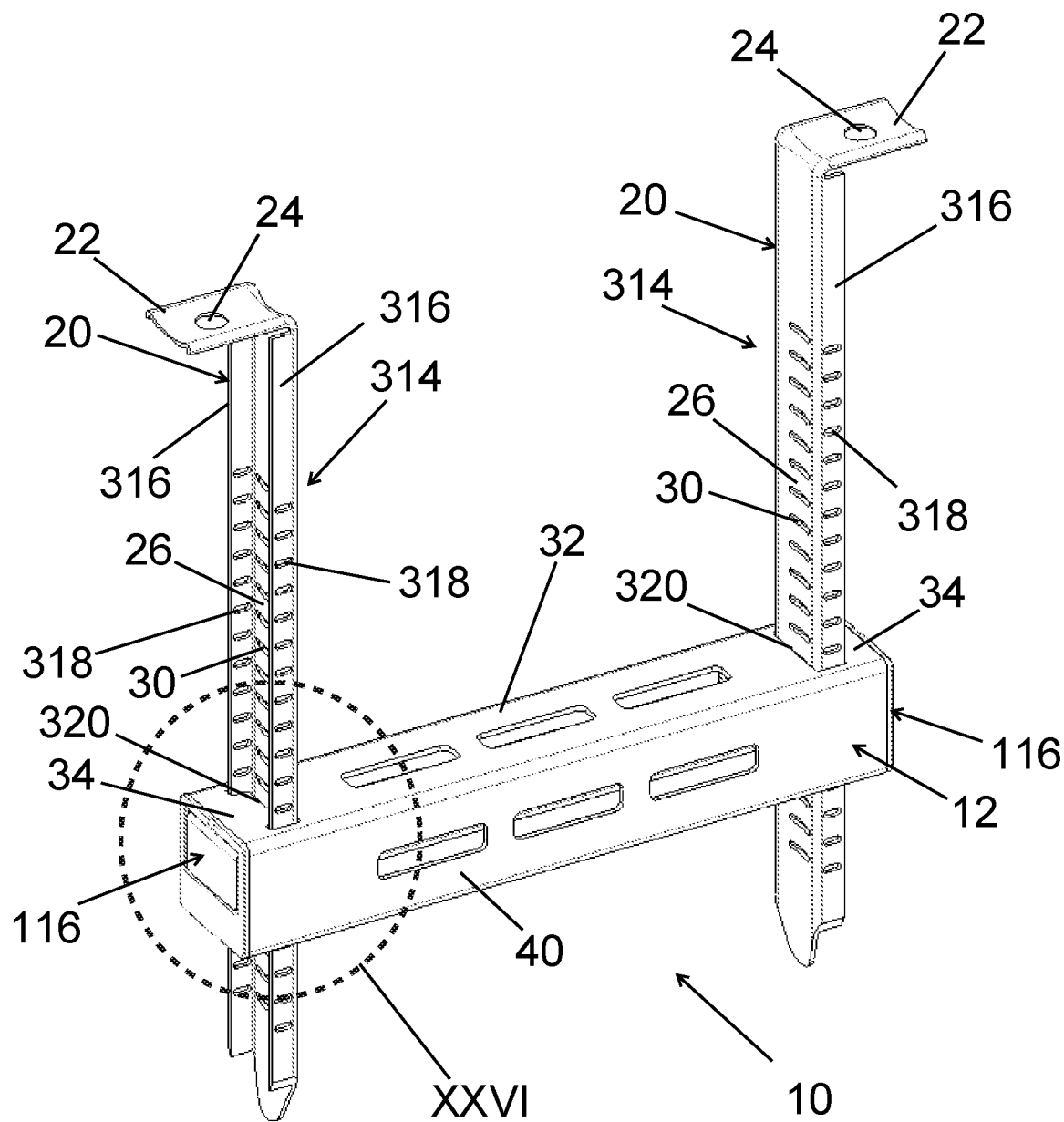
FIG. 24 is a perspective view of a suspension assembly having a second version of the suspension article.
Figure 25:
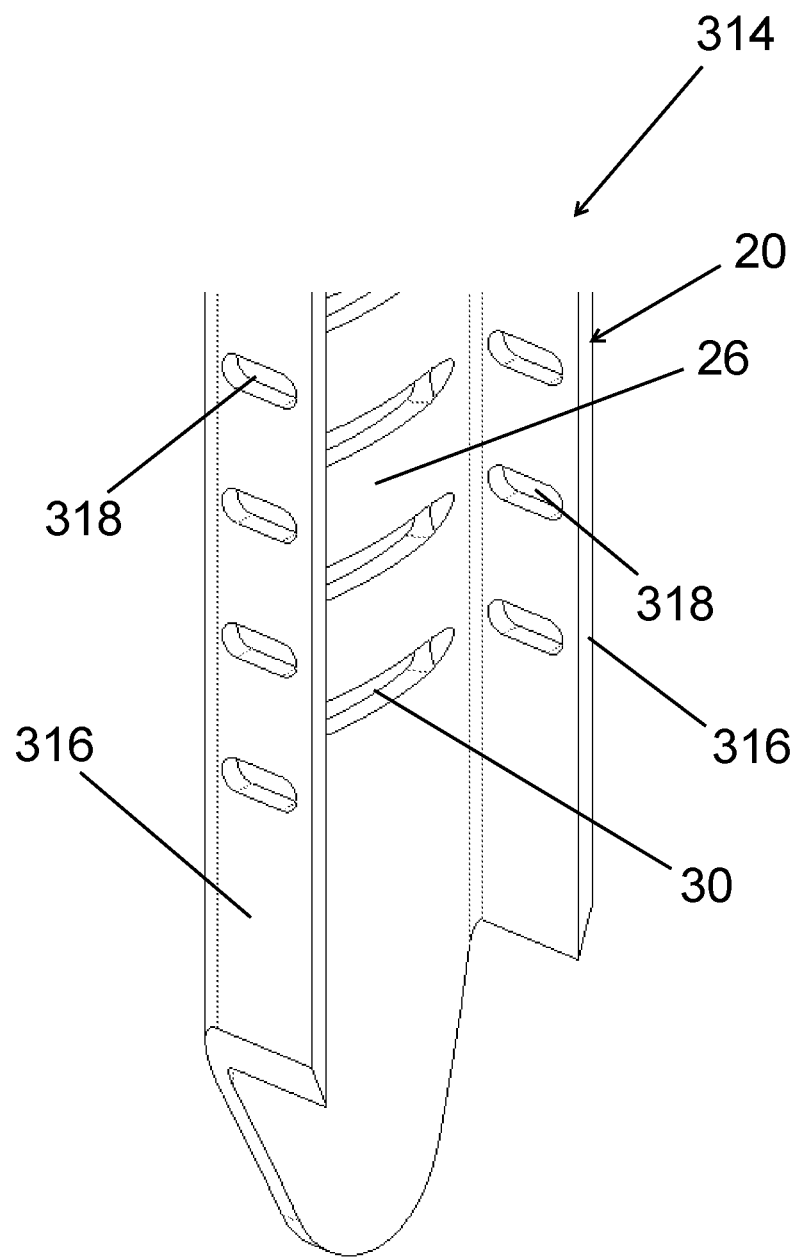
FIG. 25 is a close up view of an end region of the further suspension article.

A modification is shown in FIGS. 21 to 23 which comprises a further suspension assembly 210 comprising an elongate support member 212, two of the elongate suspension articles 14, and two securing devices 216.

The suspension articles 14 shown in FIGS. 21 to 23 are the same as the suspension articles 14 described above and shown in FIGS. 6 and 7, and have the same features. These features are designated with same reference numerals as the corresponding features in FIGS. 6 and 7.

The support member 212 comprises an elongate substantially flat central member 216 and opposite elongate substantially flat side members 218 extending downwardly from the central member 216.

The support member 212 defines two apertures in the form of slots 220 in the central member 216. A spacer region 217 of the support member 212 extends between the slots 220. A respective end region 222 extends from each slot 220 to support articles in the form of cable trays 225, as shown in FIG. 23.

Each of the slots 220 can receive a respective one of the suspension articles 14 therethrough. The support member 212 has a longitudinal main axis Y-Y. Each of the slots 220 extends parallel to the longitudinal main axis Y-Y (see FIG. 22).

Two securing devices 215 are mounted on the support member 212 beneath the slots 220, so each slot 220 is aligned with a respective one of the securing devices 215.

Referring to FIG. 22, each securing device 215 includes a securing member 230 in the form of a latch member to engage the suspension article 14 and secure the suspension article 14 to the support member 212.

Each securing device 215 further includes a mounting assembly 232 for mounting the securing arrangement 215 on the support member 212. The mounting assembly 232 comprises a holding component 234 for holding the securing member 230. The securing arrangement 215 further includes a cover member 240 for covering the holding component 234.

The mounting assembly 232 further includes two elongate fasteners 236 to fasten the securing device 215 to the support member 212. The fasteners 236 are in the form of metal fixings, such as bolts or rivets. The fasteners 236 fasten the cover member 240 to the support member 212. The fasteners 236 also fasten the holding component 234 to the support member 212.

The holding component 234 includes two fastening formations 238 through which the fasteners 236 extend to fasten the holding component 234 to the support member 212.

The cover member 240 comprises a lower portion 242 defining a further slot 244 through which the main part 20 of the suspension article 14 can extend.

The cover member 240 includes locating formations 246 for locating the cover member 240 over the holding component 234. The locating formations 246 include a rear locating formation 248 extending upwardly and across the rear of the lower portion 242.

The locating formations 246 also include a pair of front locating formations 250 extending upwardly at the front corners of the lower portion 242. The fasteners 236 extend through locating apertures 252 defined in the front and rear locating formations 248, 250 of the cover member 240 to fasten the cover member 240 across the holding component 234.

The securing member 230 is slidably movable between a securing position and a non-securing position.

In the securing position, the securing member 230 engages the suspension article 14 by being received through a selected one of the securing slots 30 in the main element 20. When so received, the support member 212 is secured to the suspension article 14 by the securing member 230 in a desired position of the support member 212 along the suspension article 14.

The securing member 230 comprises a carrying portion 254 and an insertion portion 256 on the carrying portion 254. The carrying portion 254 defines a central opening 258 into which the insertion portion 256 extends.

When the securing member 230 is in the non-securing position, the central opening 258 of each securing device 215 is aligned with the slot 220 defined by the support member 212, thereby allowing the suspension member 14 to be inserted through the slot 220 and through the securing member 30.

The insertion portion 256 is insertable through the selected securing slot 30 in the suspension member 14 to secure the suspension member 14 to the support member 212.

Each securing device 215 further includes two resilient urging members 260, in the form of compression springs, for urging the securing member 30 to the securing position.

The securing member 230 further includes a release portion 262 to allow a user to move the securing member 230 to the non-securing position. The release portion 262 is attached to the carrying portion 254, and extends transverse to the carrying portion 254.

The support member 212 includes an access formation 263 to allow access for the user to the release portion 262. The access formation 263 is an opening defined in one of the side members 218.

The release portion 262 constitutes a push button which, when pressed removes the securing member 230 from the securing slot 30, thereby moving the securing member 230 to the non-securing position. This allows the support member 212 to be removed from the suspension article 14 or repositioned along the suspension article 14.

Each securing device 215 further includes a locking member 278 on the holding component 234 to lock the securing member 230 in the securing position.

The support member 212 includes installation indicators, in the form of a respective notch 280 defined adjacent each of the slots 220. The user offers the support member 212 up to the ceiling before installation of the suspension assembly 210. The user can then mark the ceiling, through the notches to identify the exact positions to drill the fixing holes.

Referring to FIGS. 24 to 31, there is shown a suspension assembly 10 having a second version of the suspension article. In FIGS. 24 to 31, each suspension article is generally designated 314.

The suspension assembly 10 shown in FIGS. 24 to 31 comprises many of the features of the suspension assembly 10 shown in FIGS. 1 to 20. These features have been designated in FIGS. 24 to 31 with the same reference numerals as the corresponding features in FIGS. 1 to 20.

The inner region 26 of the suspension article 314 is curved in the same way as the inner region 26 of the suspension article 14. The suspension article 314 differs from the suspension article 14, in that the suspension article 314 has a substantially U-shaped end profile, and comprises opposite elongate flanges 316 in place of the hems at the edge regions 28. A respective elongate flange 316 extends along each of the edge regions 28 of the inner region 26 of the suspension article 314. The flanges 316 strengthen the suspension article 314.

The flanges 316 extend from the inner region 26 transverse thereto. The flanges 316 extend from the inner region 26 in the same direction as the mounting element 22.

Each flange 316 defines a plurality of formations in the form of supplementary slots 318 arranged in succession along the length of the respective flange 316. Each of the supplementary slots 318 is arranged adjacent to, and aligned with, a respective one of the securing slots 30.

Figure 26:
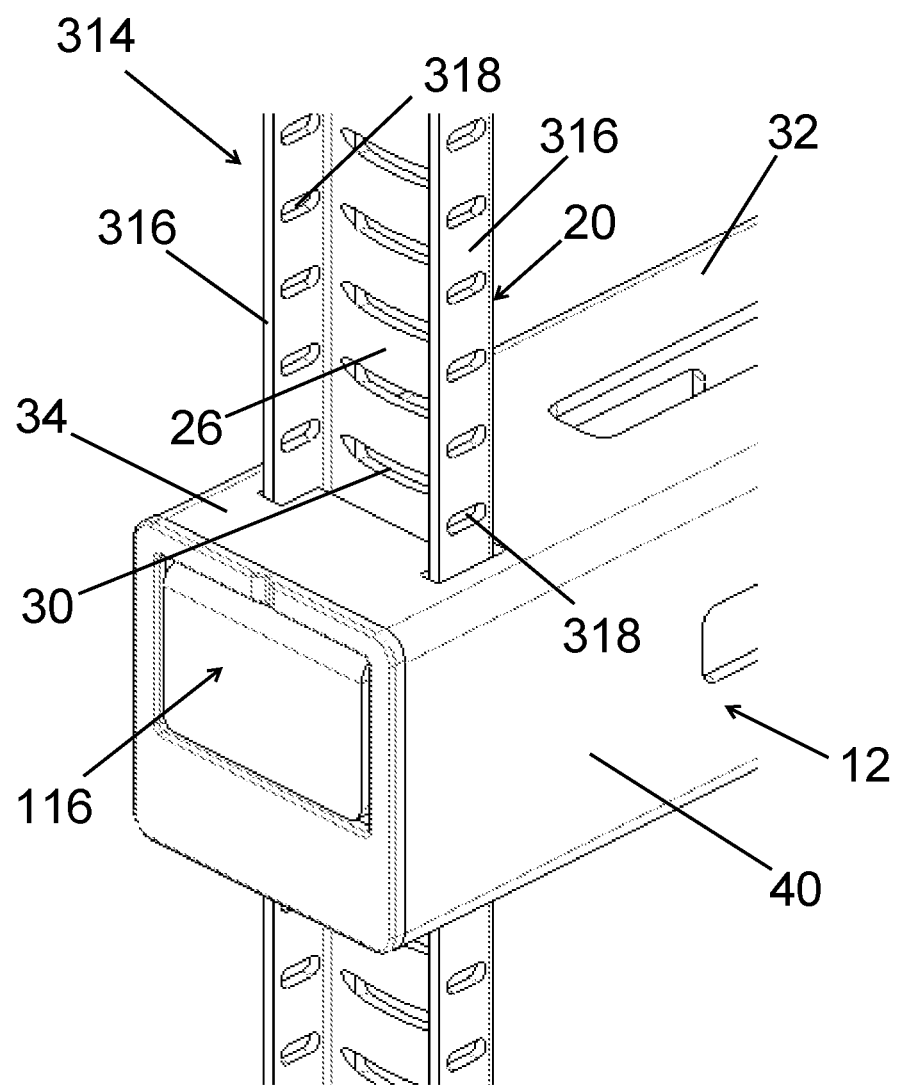
FIG. 26 is a close up view of the region marked XXVI in FIG. 24.

The central member 32 of the support member 12 defines two first apertures 320 at the respective opposite end regions 34 of the support member 12. Each of the first apertures 320 is substantially U-shaped, as shown in FIG. 26, corresponding to the shape of the end profile of the suspension article 314.

The suspension articles 314 are inserted through the first apertures 320 into the securing devices 116 mounted at each end region 34 of the support member 12. The securing devices 116 include respective latching elements 74.

Figure 27:
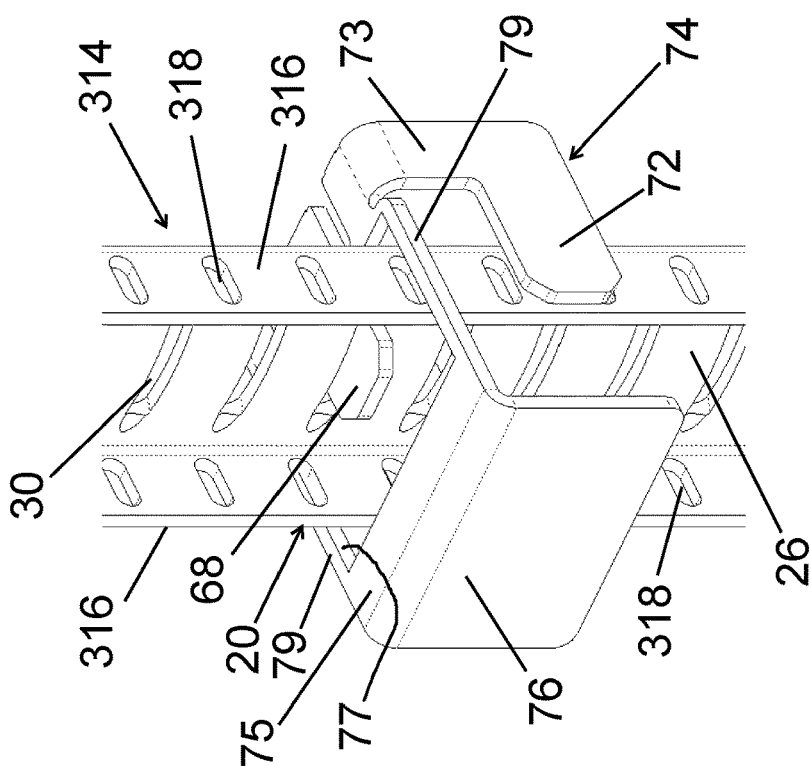
FIG. 27 is a perspective view of the second version of the suspension article with a first securing member in a securing position.

FIG. 27 shows the locking condition of the latching element 74, and the securing position of the first securing member 68. As shown in FIG. 27, the first securing member 68 is received through a selected one of the securing slots 30 in the inner region 26 of the suspension article 314, thereby securing the support member 12 to the suspension articles 314.

Figure 28:
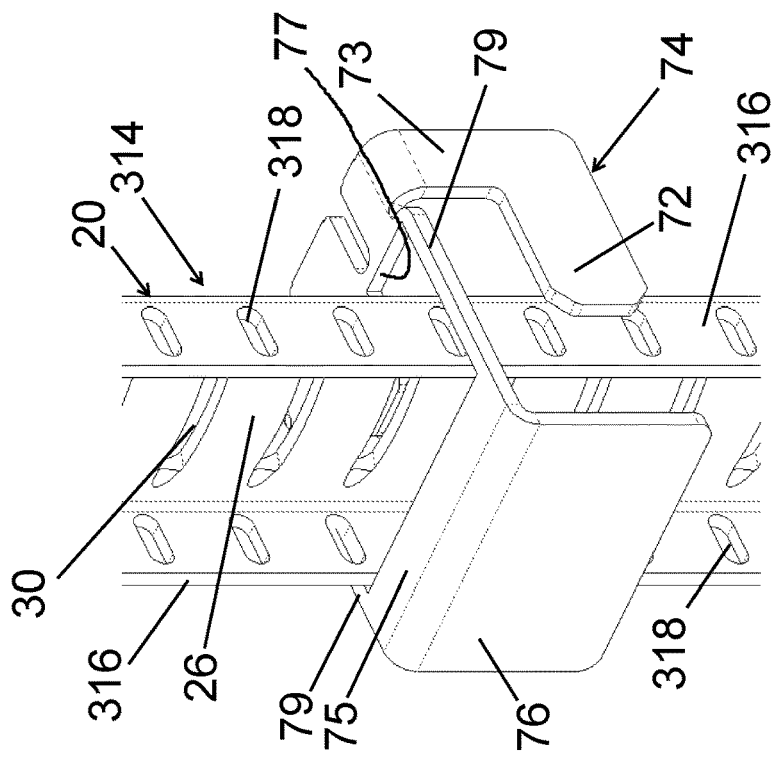
FIG. 28 is a view similar to FIG. 27, in which the first securing member is in a non-securing position.

FIG. 28 shows the non-locking condition of the latching element 74, and the non-securing position of first securing member 68. As shown in FIG. 28, the first securing member 68 is not received in any of the securing slots 30, thereby allowing the support member 12 to be moved along the suspension articles 314, or removed therefrom.

Figure 30:
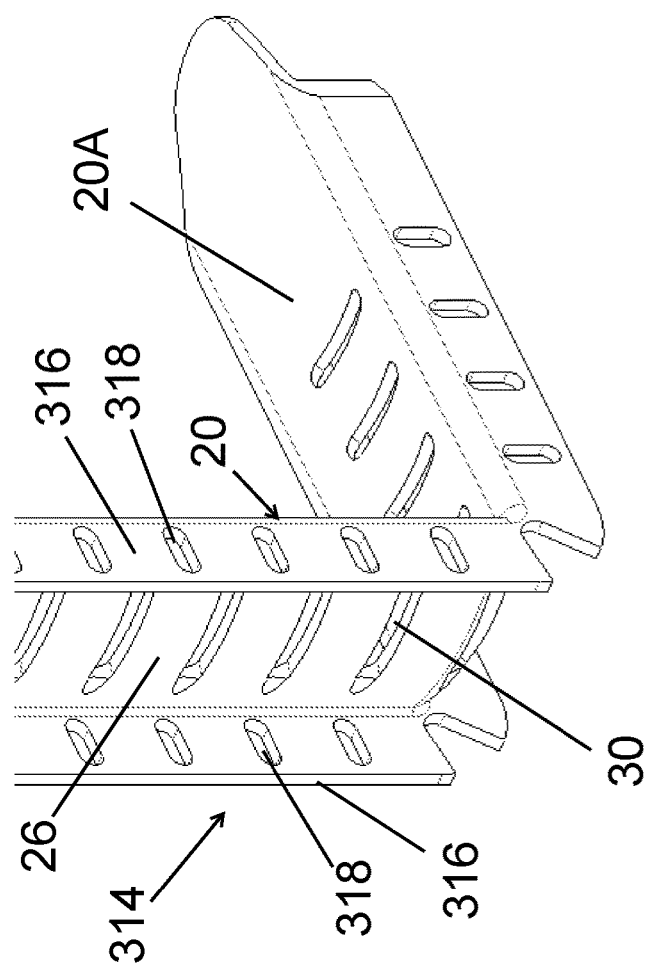
FIG. 30 is a close up view of the end region shown in FIG. 29, in which a main element of the further suspension article is deformed to a stowed condition.
Figure 29:
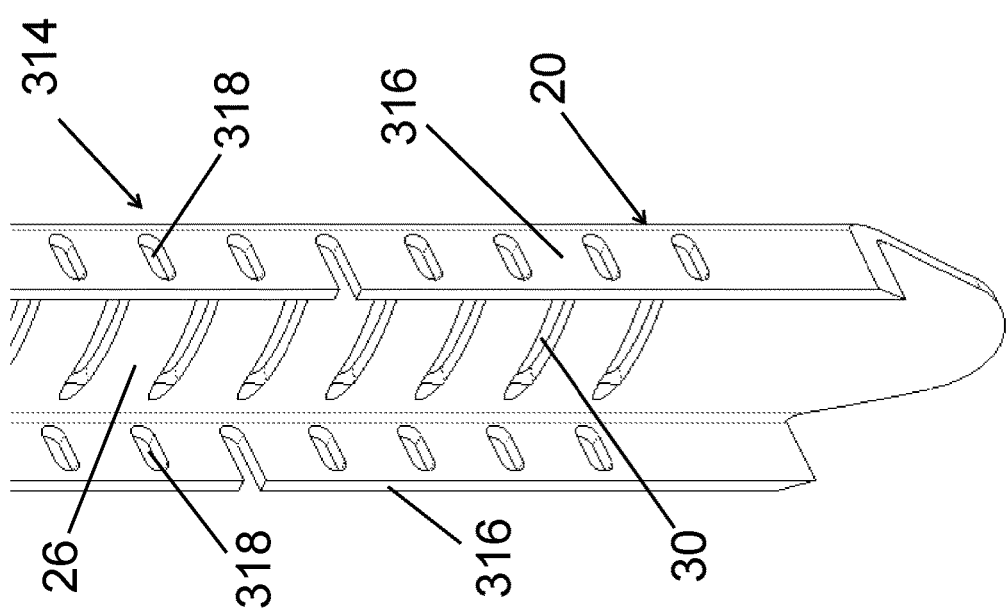
FIG. 29 is a close up view of an end region of the second suspension article, showing cuts made adjacent to a supplementary slot.
Figure 31:
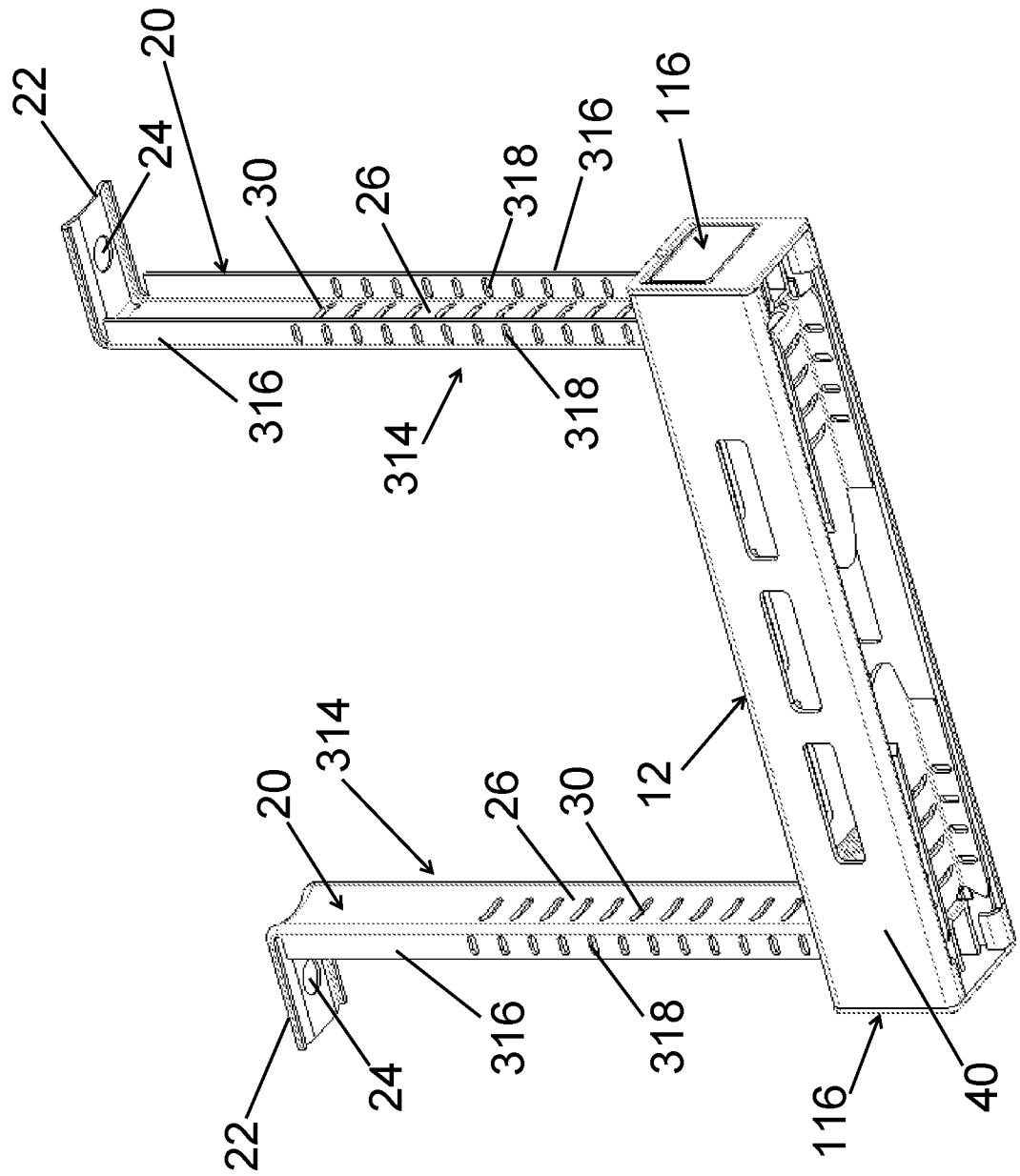
FIG. 31 is a perspective view from below of the suspension assembly shown in FIG. 24, in which the further suspension article is in a stowed condition.
Figure 32:
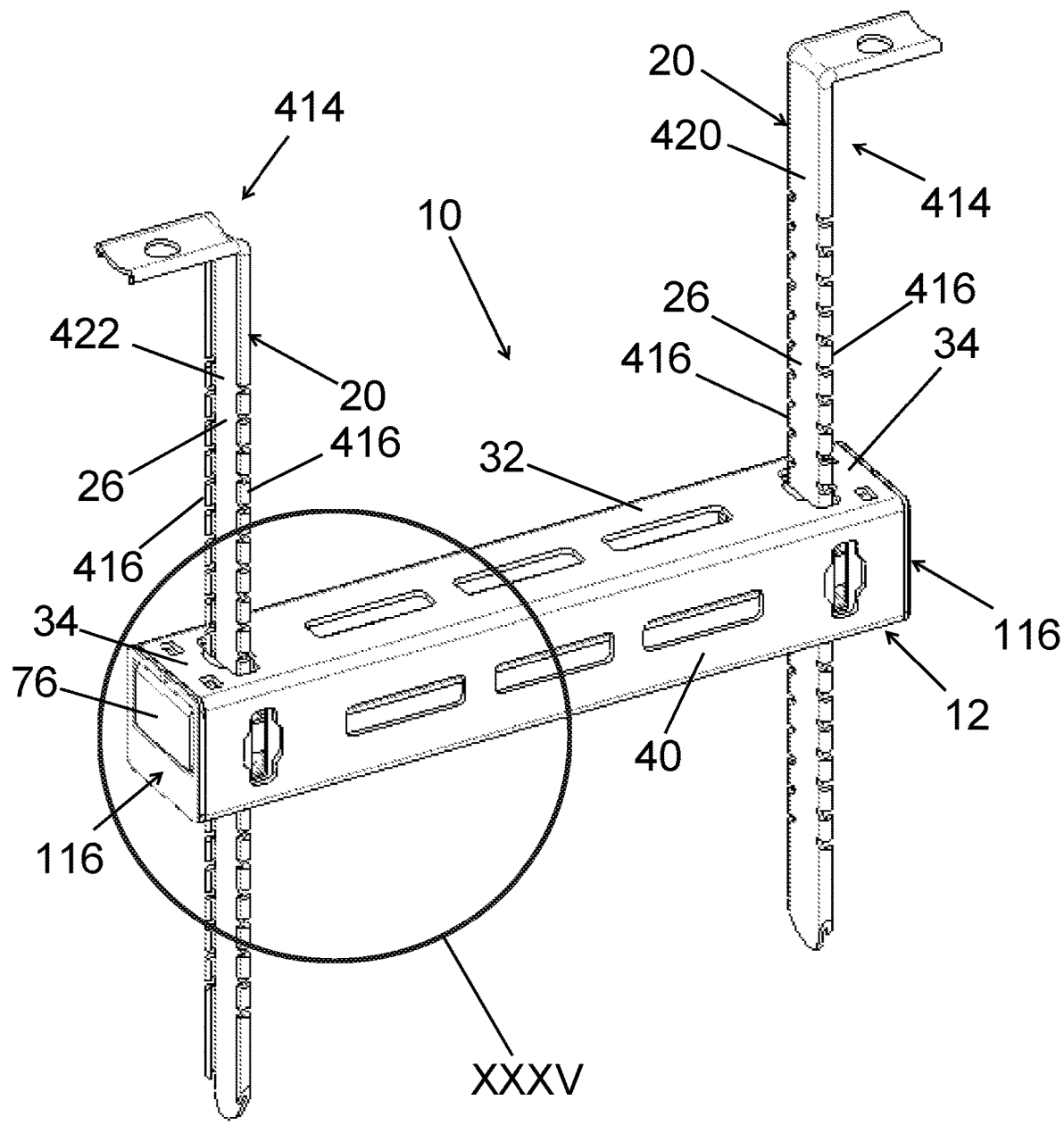
FIG. 32 is a perspective view of a suspension assembly having a third version of the suspension article.

FIGS. 29 to 31 show the deformation of the lower end regions 20A of suspension articles 314 to stowed conditions. In FIG. 29, the free edge of each flange 316 is cut adjacent one of the supplementary slots 318. The cutting occurs adjacent the supplementary slots aligned with one of the securing slots 30. The inner region 26 of the main element 20 can then be deformed to a stowed condition by folding the inner region about the securing slot 30 adjacent the supplementary slots 318 at which the flanges 316 were cut FIG. 31 shows the lower end regions of both suspension articles 314 deformed to their stowed conditions, and stowed within the support member 12 between the side members 40.

Figure 12:
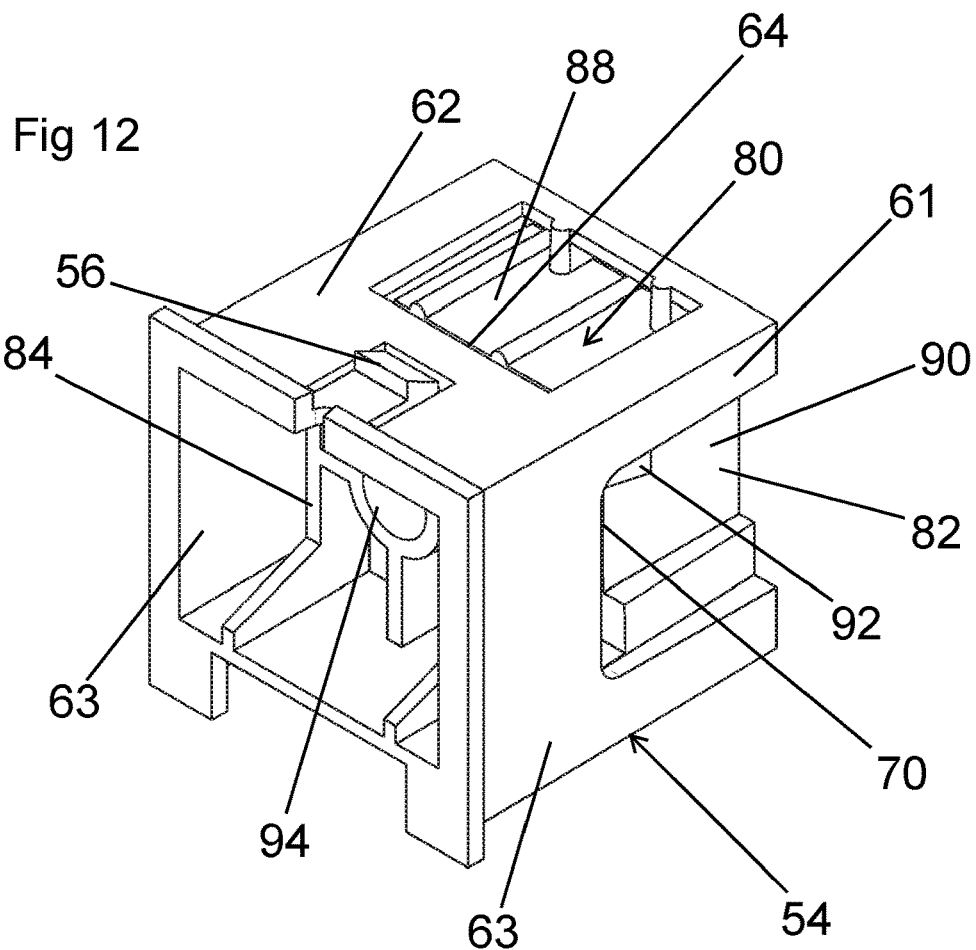
FIG. 12 is a front perspective view from above of a housing, forming part of the securing device.
Figure 13:
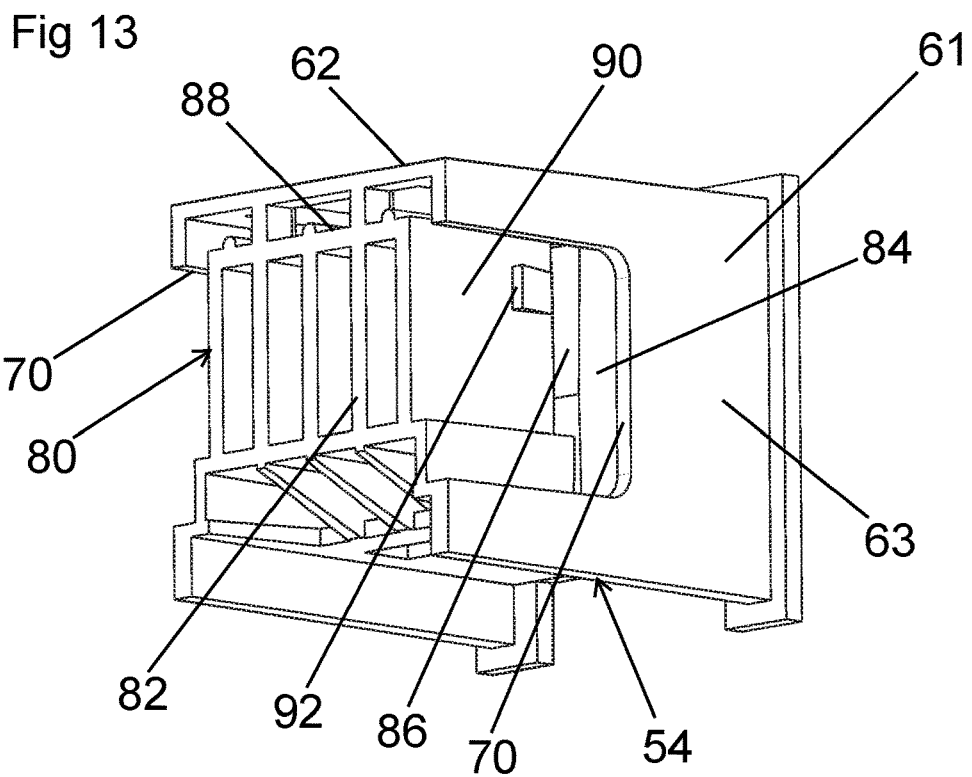
FIG. 13 is a rear perspective view of the housing.
Figure 14:
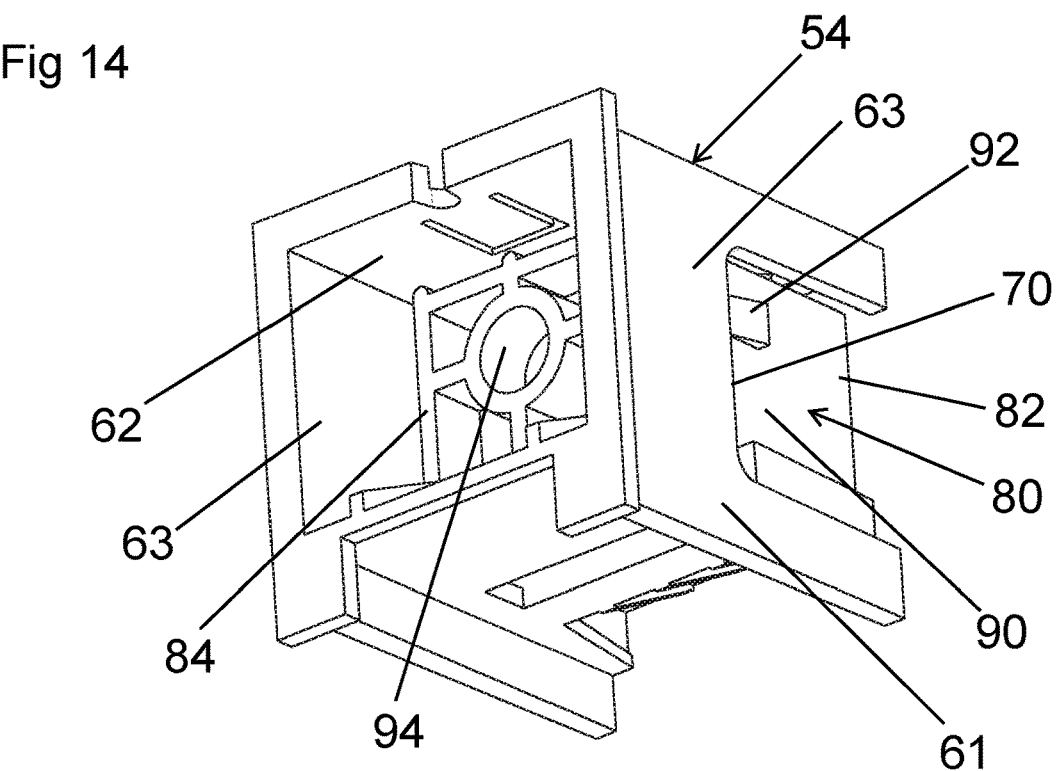
FIG. 14 is a perspective view from below and one side of the housing.
Figure 15:
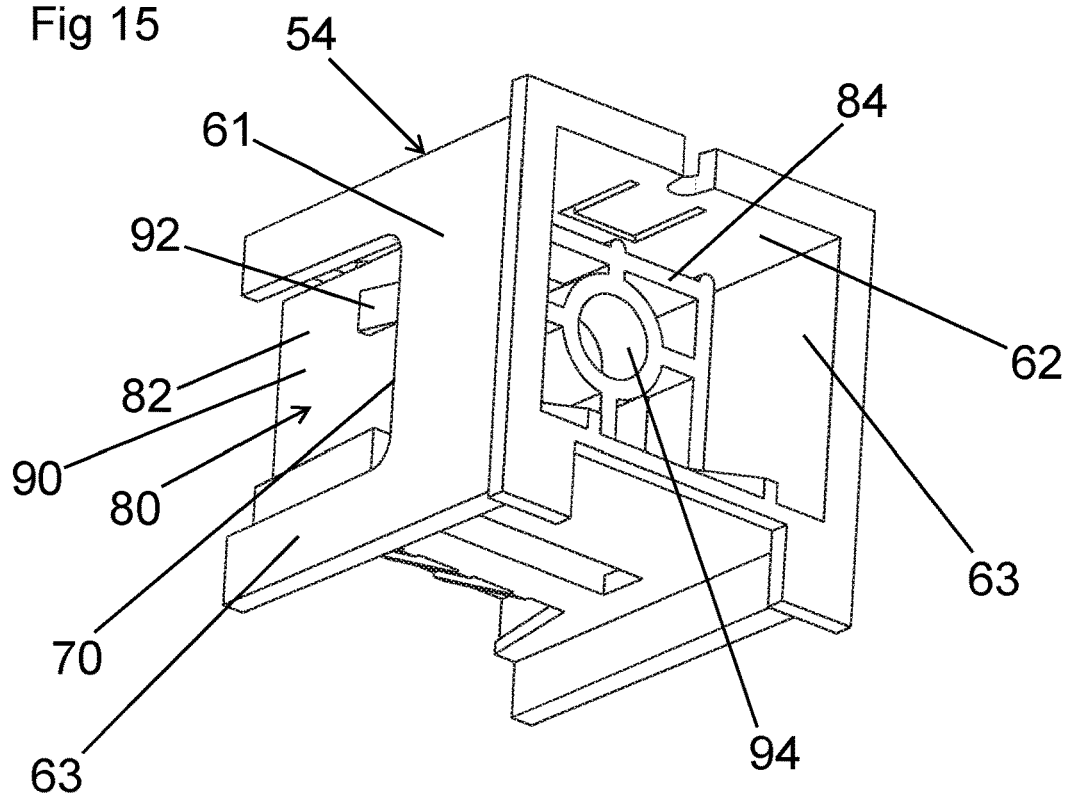
FIG. 15 is a perspective view from below and the opposite side of the housing.
Figure 16:
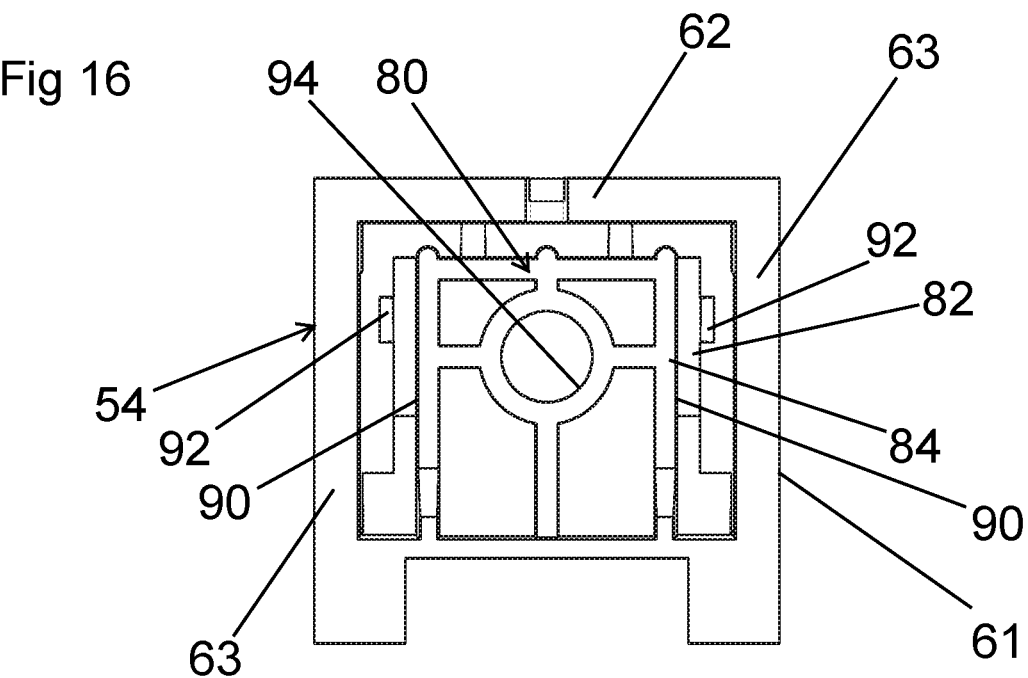
FIG. 16 is a front view of the housing.
Figure 17:
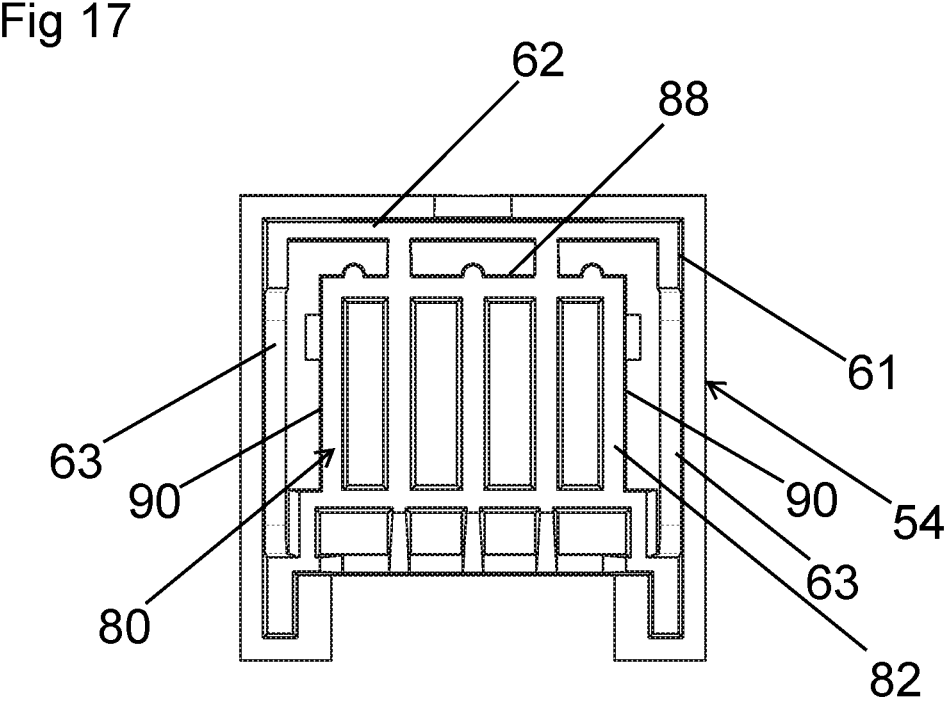
FIG. 17 is a rear view of the housing.
Figure 18:
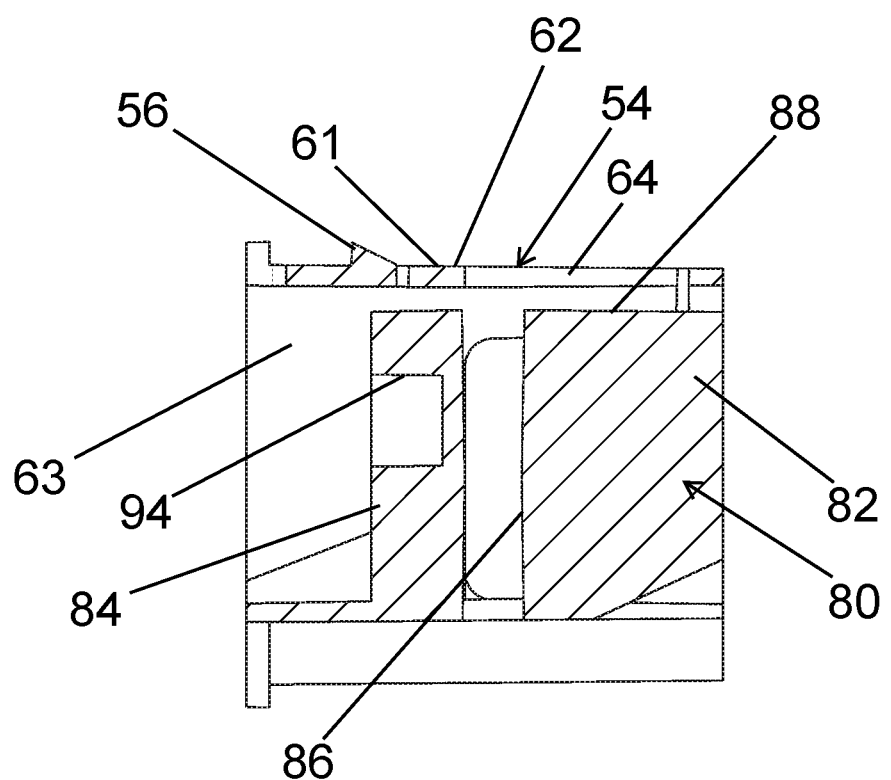
FIG. 18 is a sectional side view of the housing.

Although not shown in the drawings, the suspension articles 314 could be used with the support member 12 in a second orientation, as shown in FIG. 12. Two second apertures having a U-shaped configuration, similar to the first apertures 320, are defined in each side member 40.

When the suspension articles 314 are received through the second apertures, they are secured to the support member 12 by means of the second securing member 72 on the latching element 74, in the same way as described above.

FIGS. 32 to 39 show a suspension assembly 10 having a third version of the suspension article. In FIGS. 32 to 39, each suspension article is generally designated 414.

The suspension assembly 10 shown in FIGS. 32 to 39 comprises many of the features of the suspension assembly 10 shown in FIGS. 1 to 20. These features have been designated in FIGS. 32 to 39 with the same reference numerals as the corresponding features in FIGS. 1 to 20.

Figure 34:
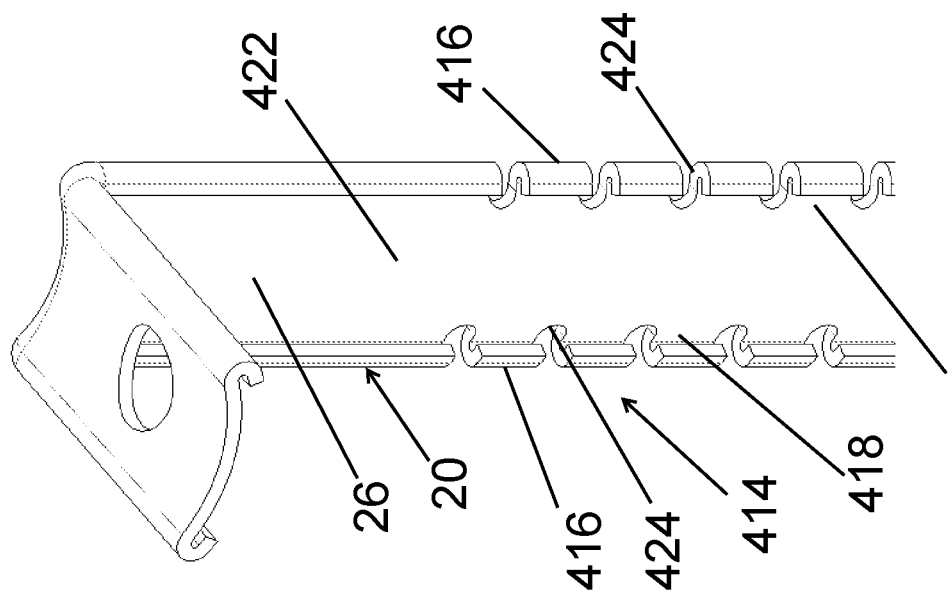
FIG. 34 is a perspective view from a second opposite direction of the upper region of the third version of the suspension article.
Figure 33:
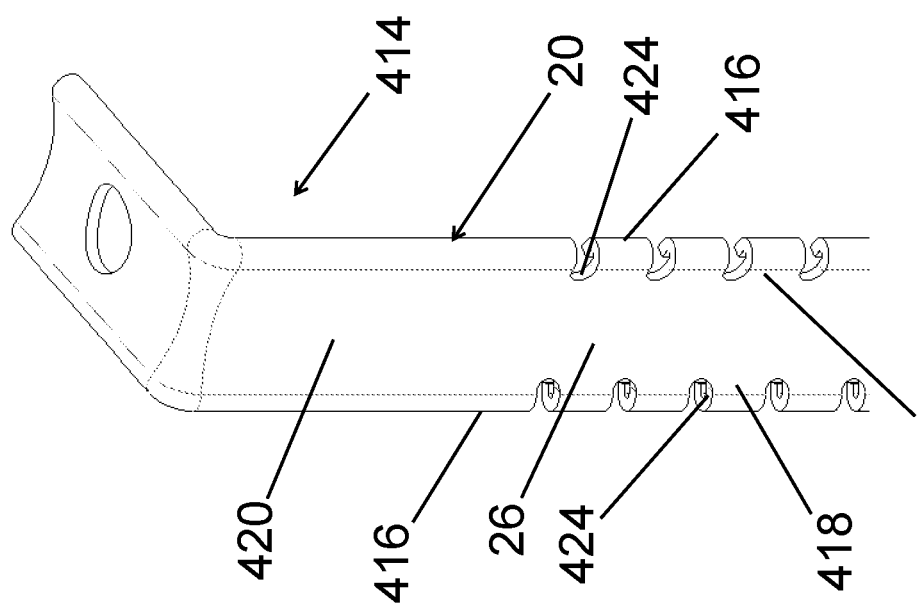
FIG. 33 is a perspective view from a first direction of an upper region of the third version of the suspension article.
Figure 35:
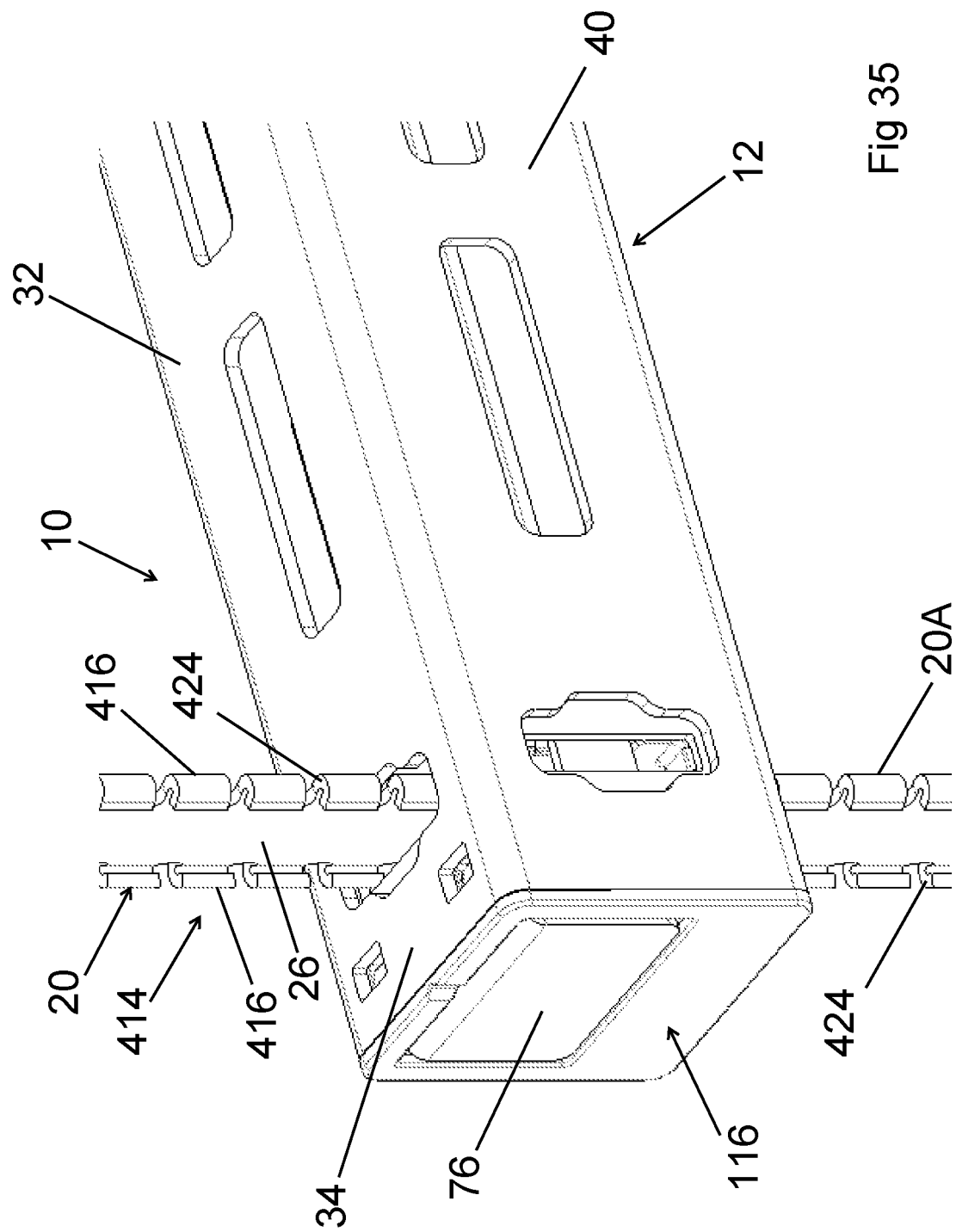
FIG. 35 is a close up view of the region marked XXXV in FIG. 32.

The inner region 26 of the main element 20 of the suspension article 414 is curved in the same way as the inner region 26 of the suspension article 14. Referring to FIGS. 33 and 34, the main element 20 of the suspension article 414 has opposite outer edges 416, and opposite edge regions 418 extending inwardly from the outer edges 416. The main element 20 also has opposite faces 420, 422.

The suspension article 414 differs from the suspension article 14, in that each of the edge regions 418 defines a plurality of securing openings in the form of securing slots 424. The securing slots 424 extend inwardly from the outer edges 416, and through the main element 20 between the opposite faces 420, 422.

Each of the securing slots 424 in one of the edge regions 418 is aligned with a respective securing slot 424 in the opposite edge region 418 to form a plurality of aligned pair of securing slots 424.

Each of the opposite edge regions 418 of the main element 20 is folded to form a hem 426, thereby providing a hemmed edge region 418. The hems 426 are formed as open hems. The securing slots 424 extend through the hems 426.

The suspension articles 414 are received through the apertures 38 defined in the end regions 34 of the central member 32. One of the securing devices 116 is mounted in the end regions 34 of the support member 12.

Figure 37:
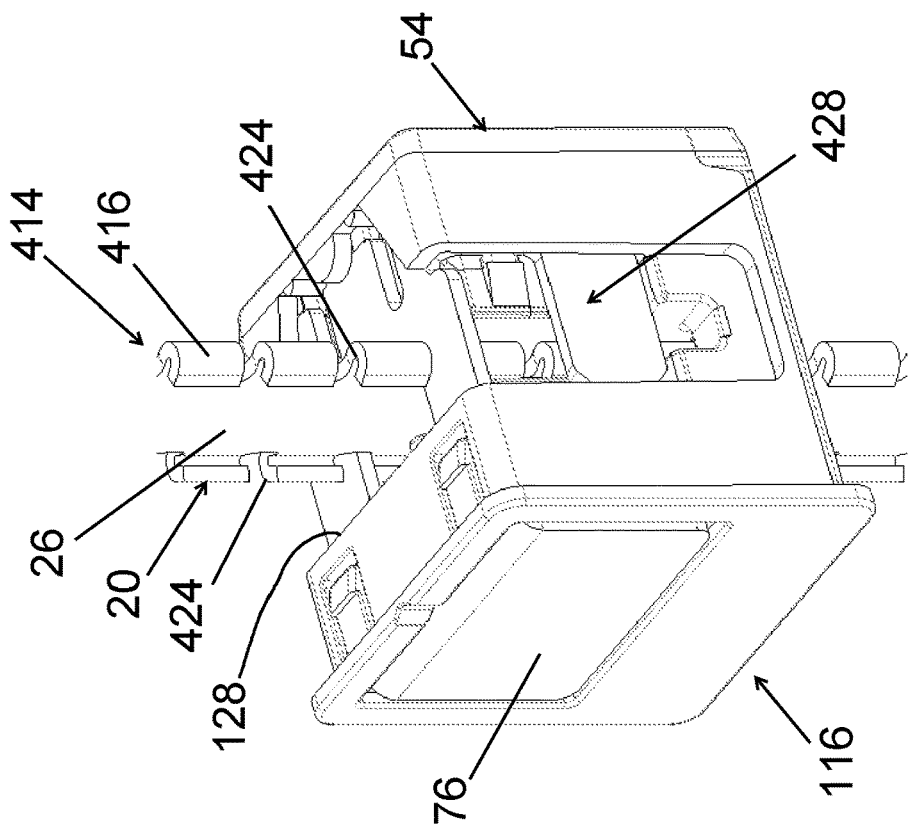
FIG. 37 is a view similar to FIG. 36, but with the reinforcing member removed.
Figure 36:
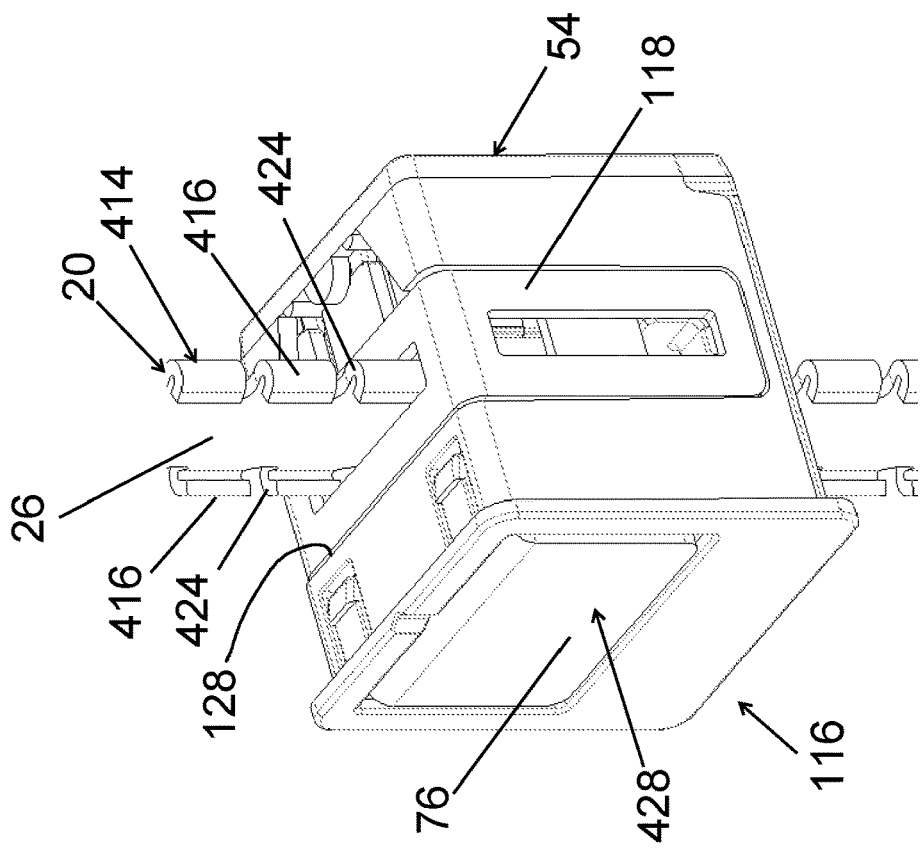
FIG. 36 shows the third suspension article secured by the securing device having a reinforcing member.
Figure 39:
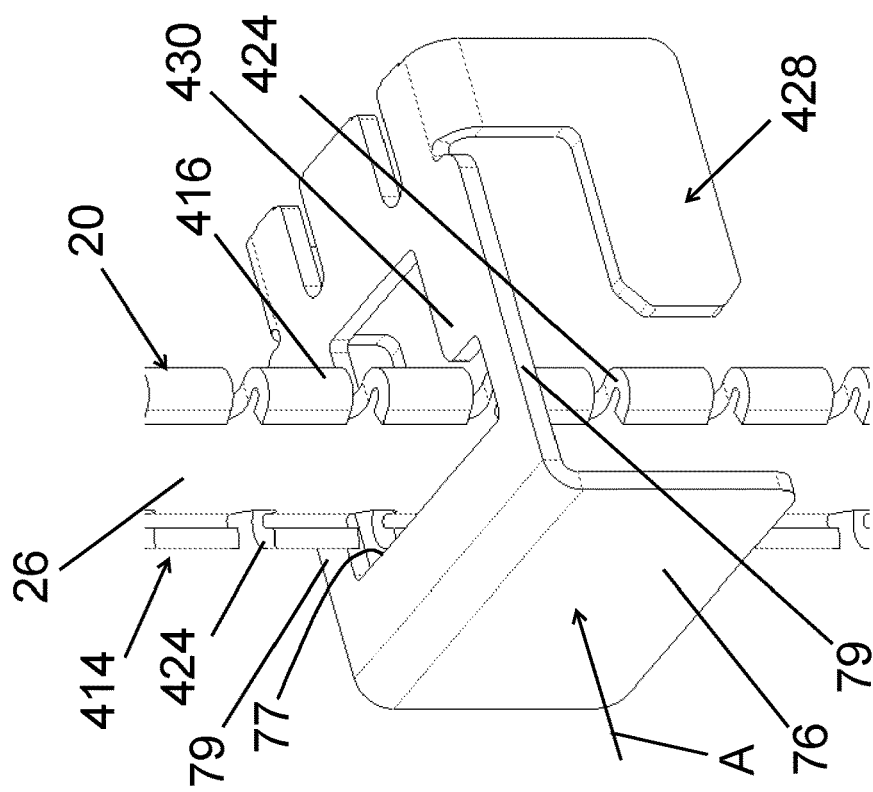
FIG. 39 is a view similar to FIG. 38, in which the first securing member is in a non-securing position.
Figure 38:
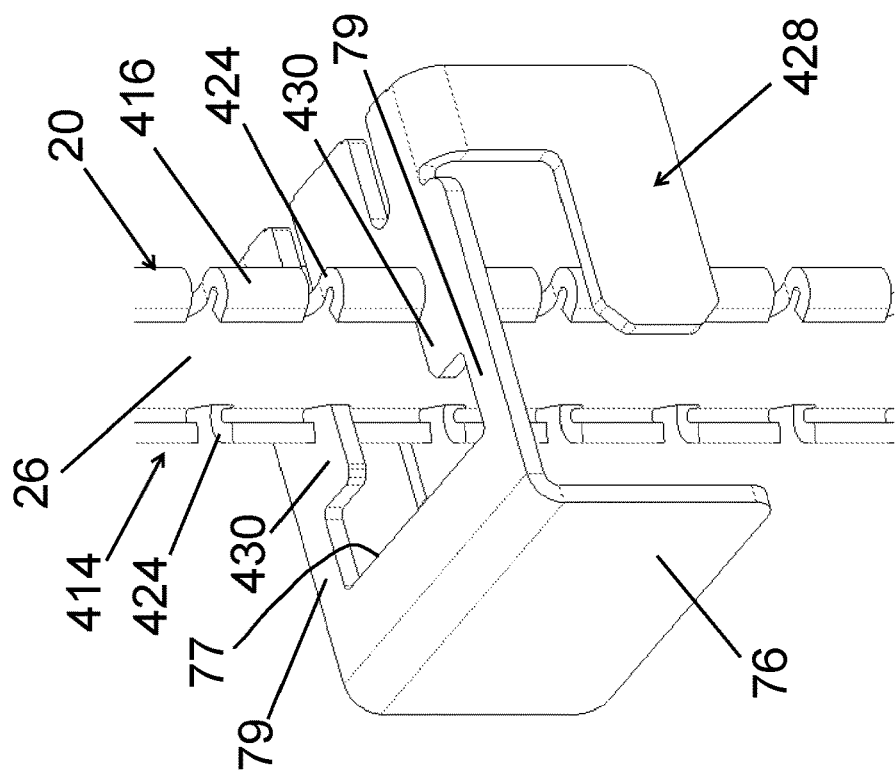
FIG. 38 is a perspective view of the third version of the suspension article with a first securing member in a securing position.

Referring to FIGS. 37 and 38, each suspension article 414 is received through the entry slot 128 in the reinforcing member 118 of each of the securing devices 116. When so received, each suspension article 414 is secured to the securing devices 116 by means of a latching element 428. FIG. 38 shows the suspension article 414 received in the securing device 116, with the reinforcing member 118 removed so that the position of the latching element 428 relative to the suspension article 414 can be seen.

When so secured, a lower region 20A of the main element 20 of the suspension article 414 can be deformed to a stowed condition within the support member 12 between the side members 40, in the same way as the lower regions 20A of the first and second versions of the suspension article 14, 314.

The deformation of the main element 20 may be made at an aligned pair of the securing slots 424.

The latching element 428 comprises two of the first securing members, generally designated 430, on opposite sides of the hole 77. The first securing members 430 extend from the connecting members 79 into the hole 77. FIG. 38 shows the first securing members 430 in their securing positions, with the latching element 428 in the locking condition. This is the same arrangement of the latching element 428 and the suspension article shown in FIG. 37.

In the securing position of first securing members 430, the first securing members 430 are received through a selected pair of aligned securing slots 424 in the main element 20.

The latching element 428 can be moved to the non-locking condition shown in FIG. 37 by pressing the release tab 76 in the direction indicated by the arrow A. The position of the suspension article 414 can then be adjusted therein. When the adjustment has been made, the release tab 76 can be released, and the urging member 78 urges the latching element 428 to its locked condition, thereby moving the first securing members 430 back to their securing positions to secure the suspension article 414 to the securing device 116.

The invention claimed is:

1. A suspension assembly comprising:
a support member for supporting an item;
an elongate suspension article defining a securing opening;
a securing device on the support member;
the support member defining an aperture through which the suspension article can be inserted;
wherein the securing device has a securing member;
the securing member being movable across the aperture between a securing position and a non-securing position, the securing member being receivable through the securing opening in the suspension article to secure the support member to the suspension article when the suspension article is received through the aperture and the securing member is in the securing position;
wherein the support member has a central member and a side member arranged transverse to each other, the central member defining the aperture through which the suspension article can be inserted, the aforesaid aperture constituting a first aperture defined by the central member, and the suspension article being insertable through the first aperture when the support member is in a first orientation; and
the side member defining a second aperture, the suspension article being insertable through the second aperture when the support member is in a second orientation.

2. A suspension assembly according to claim 1, wherein the support member has two of the side members, each side member extending from a respective opposite edge of the central member, each side member defining a respective second aperture, both of the side members extending in the same direction from the central member, whereby the support member has a substantially U shaped configuration.

3. A suspension assembly comprising:
a support member for supporting an item;
an elongate suspension article defining a securing opening;
a securing device on the support member;
the support member defining an aperture through which the suspension article can be inserted;
wherein the securing device has a securing member;
the securing member being movable across the aperture between a securing position and a non-securing position, the securing member being receivable through the securing opening in the suspension article to secure the support member to the suspension article when the suspension article is received through the aperture and the securing member is in the securing position;
wherein the securing device comprises an attaching arrangement for attaching the securing device to the support member;
the attaching arrangement comprising a housing in which the securing member is housed, the housing having an external wall arrangement, and the housing further including an internal arrangement within the external wall arrangement;
wherein the external wall arrangement comprises a central wall portion, and the internal arrangement comprises a first internal portion and a second internal portion;
wherein the central wall portion defines a central aperture, and the first and second internal portions define a gap therebetween, the central aperture and the gap being aligned with each other,
whereby when the securing member is in the securing position, the securing member extends across the central aperture.

4. A suspension assembly according to claim 3, including a reinforcing member to reinforce the external wall arrangement, the reinforcing member being arranged on the external wall arrangement, the reinforcing member comprising an elongate central reinforcing portion extending across the central wall portion of the external wall arrangement.

5. A suspension assembly according to claim 4, wherein the reinforcing member is arranged on the external wall arrangement in alignment with the gap between the first and second internal portions, the external wall arrangement defining an elongate aperture in which the reinforcing member is received.

6. A suspension assembly according to claim 5, wherein the central wall portion defines an elongate central aperture in which the central reinforcing portion of the reinforcing member is received, each side wall portion defining an elongate side aperture in which a respective one of the side reinforcing portions is received.

7. A suspension assembly according to claim 5, wherein the suspension article has an elongate main element, and the central reinforcing portion defines a slot to receive the main element therethrough when the support member is in the first orientation; and each side reinforcing portion defines a slot to receive the main element of the suspension article therethrough when the support member is in the second orientation.

8. A suspension assembly according to claim 4, including two opposed side wall portions, the central wall portion extending between the side wall portions.

9. A suspension assembly according to claim 8, including a reinforcing member to reinforce the external wall arrangement, wherein the reinforcing member comprises two opposed side reinforcing portions, each side reinforcing portion extending from the central reinforcing portion across a respective one of the side wall portions of the external wall arrangement.

10. A suspension assembly comprising:
a support member for supporting an item;
an elongate suspension article defining a securing opening;
a securing device on the support member;
the support member defining two apertures through which the suspension article can be inserted;
wherein the securing device has first and second securing members arranged transverse to each other;
the securing members being movable across the aperture between respective securing and non-securing positions, the securing members being receivable through the securing opening in the suspension article to secure the support member to the suspension article when the suspension article is received through one of the aperture and the securing members are in the securing positions.

11. A suspension assembly according to claim 3, wherein the suspension article has an elongate main element, and the main element is received through the central aperture in the central wall portion when said main element is received in the aperture defined by the support member; and the main element of the suspension article extends through the gap between the first internal portion and the second internal portion when the main element is received in the first aperture defined by the central member.

12. A suspension assembly according to claim 5, wherein the first internal portion has a central surface adjacent the central wall portion of the external wall arrangement, the central surface being spaced from the central wall portion of the external wall arrangement; and the first internal portion has two opposite side surfaces, each side surface being adjacent a respective one of the side wall portions of the external wall arrangement, each side surface being spaced from said respective one of the side wall portions of the external wall arrangement.

13. A suspension assembly according to claim 12, wherein the space between the central wall portion and the central surface receives the first securing member, the central aperture defined by the central wall portion extending across the central surface; and each space between both side wall portions and the respective side surface receives the respective second securing member.

14. A suspension assembly according to claim 12, wherein each side wall portion defines a side aperture, whereby when the housing is inserted in the support member, each side aperture defined by the respective side wall portion is aligned with the, or each, second aperture defined by the respective side member; and the side apertures in the side wall portions are arranged opposite each other in alignment, the side aperture in each side wall portion being arranged in alignment with the second apertures in the respective side member.

15. A suspension assembly according to claim 14, wherein the main element of the suspension article extends through the side apertures in both side wall portions when said main element of the suspension article is received in the second apertures defined by the side members; and the main element of the suspension article extends through the gap between the first internal portion and the second internal portion when said main element of the suspension article is received through the second apertures defined by the side members.

16. A suspension assembly comprising:
a support member for supporting an item;
an elongate suspension article defining a securing opening;
a securing device on the support member;
the support member defining an aperture through which the suspension article can be inserted;
wherein the securing device has a securing member;
the securing member being movable across the aperture between a securing position and a non-securing position, the securing member being receivable through the securing opening in the suspension article to secure the support member to the suspension article when the suspension article is received through the aperture and the securing member is in the securing position;
wherein the suspension article comprises an elongate main element, the main element having a longitudinally extending main axis, and the main element being cooperable with the securing member to secure the support member to the suspension article;
wherein the main element is curved about said main axis.

17. A suspension assembly according to claim 16, wherein the main element includes an elongate inner region extending along the main axis, the inner region defining the securing opening, and the main element further includes an elongate edge region extending along the inner region, the edge region being thicker than the inner region.

18. A suspension assembly comprising:
a support member for supporting an item;
an elongate suspension article defining a securing opening;
a securing device on the support member;
the support member defining an aperture through which the suspension article can be inserted;
wherein the securing device has a securing member;
the securing member being movable across the aperture between a securing position and a non-securing position, the securing member being receivable through the securing opening in the suspension article to secure the support member to the suspension article when the suspension article is received through the aperture and the securing member is in the securing position;

wherein the suspension article comprises an elongate main element, the main element including an elongate inner region, and the main element further including an elongate edge region extending along the inner region;

wherein the edge region is deformed to form a hem.

19. A securing device for use in a suspension assembly, the securing device comprising:

a securing member; and an attaching arrangement for attaching the securing device to a support member, the securing member being held by the attaching arrangement;

wherein the securing member is movable between securing and non-securing positions;

wherein the attaching arrangement comprises a housing in which the securing member is housed, the housing having an external wall arrangement, and the housing further including an internal arrangement within the external wall arrangement;

the internal arrangement comprising a first internal portion and a second internal portion, the first and second internal portions defining a gap therebetween.

* * * * *